United States Patent
Cheng et al.

(10) Patent No.: US 11,177,923 B2
(45) Date of Patent: Nov. 16, 2021

(54) USER EQUIPMENT IDENTIFIER INFORMATION

(71) Applicant: QUALCOMM Incorporated, San Diego, CA (US)

(72) Inventors: Peng Cheng, Beijing (CN); Wanshi Chen, San Diego, CA (US); Hao Xu, Beijing (CN); Umesh Phuyal, San Diego, CA (US); Alberto Rico Alvarino, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 16/630,110

(22) PCT Filed: Jun. 25, 2018

(86) PCT No.: PCT/CN2018/092657
§ 371 (c)(1),
(2) Date: Jan. 10, 2020

(87) PCT Pub. No.: WO2019/037534
PCT Pub. Date: Feb. 28, 2019

(65) Prior Publication Data
US 2020/0169370 A1 May 28, 2020

(30) Foreign Application Priority Data

Aug. 21, 2017 (WO) ................ PCT/CN2017/098356

(51) Int. Cl.
*H04L 5/00* (2006.01)
*H04W 72/04* (2009.01)

(52) U.S. Cl.
CPC .......... *H04L 5/0053* (2013.01); *H04L 5/0037* (2013.01); *H04L 5/0051* (2013.01); *H04W 72/048* (2013.01); *H04W 72/0413* (2013.01)

(58) Field of Classification Search
CPC ... H04L 5/0053; H04L 5/0037; H04L 5/0051; H04W 72/0413; H04W 72/048
See application file for complete search history.

(56) References Cited

U.S. PATENT DOCUMENTS

| 2010/0153816 A1 | 6/2010 | Li et al. |
| 2011/0194511 A1 | 8/2011 | Chen et al. |
(Continued)

FOREIGN PATENT DOCUMENTS

| CN | 1627677 A | 6/2005 |
| CN | 105075365 A | 11/2015 |
(Continued)

OTHER PUBLICATIONS

Mediatek Inc: "DCI Aggregation in 2-Stage DCI", R1-1702723, 3GPP TSG RAN WG1 #88, DCI Aggregation IN 2-Stage DCI_Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017, XP051209870, 6 Pages, From the Internet: URL:http://www.3gpp.org/ftp/Meetings_3GPP_SYNC/RAN1/Docs/, [retrieved on Feb. 12, 2017] Introduction, p. 1, Par. 1, Discussion on DCI Aggregation, p. 1, Par. 2-p. 5.
(Continued)

*Primary Examiner* — Duc C Ho
(74) *Attorney, Agent, or Firm* — Procopio, Cory, Hargreaves, LLP; Nerrie M. Zohn

(57) ABSTRACT

In an example, a method of wireless communication of a base station may include assigning, by the base station, one or more resources to a group comprising a plurality of UEs
(Continued)

that includes a first UE. The method may include receiving, by the base station from the first UE, a message on the one or more assigned resources. The message may include a cyclic redundancy check (CRC) scrambled with a group identifier for the group comprising the plurality of UEs. The message may include an indication of a UE identifier for the first UE within the group. The message may include a DMRS, where the indication of the UE identifier is represented by a sequence of the DMRS.

31 Claims, 13 Drawing Sheets

(56) References Cited

U.S. PATENT DOCUMENTS

| | | | |
|---|---|---|---|
| 2018/0123765 A1* | 5/2018 | Cao | H04L 1/1671 |
| 2018/0332515 A1* | 11/2018 | Au | H04W 40/36 |

FOREIGN PATENT DOCUMENTS

| | | |
|---|---|---|
| EP | 2827667 A1 | 1/2015 |
| WO | 2007091174 A2 | 8/2007 |
| WO | 2011100326 A1 | 8/2011 |
| WO | 2014142464 A1 | 9/2014 |
| WO | 2016206497 A1 | 12/2016 |

OTHER PUBLICATIONS

Supplementary European Search Report—EP18847477—Search Authority—The Hague—dated Apr. 13, 2021.

International Search Report and Written Opinion—PCT/CN2017/098356—ISA/EPO—dated May 14, 2018.

International Search Report and Written Opinion—PCT/CN2018/092657—ISA/EPO—dated Sep. 14, 2018.

* cited by examiner

USER EQUIPMENT IDENTIFIER INFORMATION

CROSS-REFERENCE TO RELATED APPLICATION

This application is a National Phase entry of PCT International Application No. PCT/CN2018/092657, entitled "USER EQUIPMENT IDENTIFIER INFORMATION" and filed on Jun. 25, 2018, which claims the benefit of PCT International Application No. PCT/CN2017/098356, entitled "User Equipment Identifier Information" and filed on Aug. 21, 2017, which are expressly incorporated by reference herein in their entirety.

BACKGROUND

Technical Field

The present disclosure relates generally to communication systems, and more particularly, to one or more techniques for signaling user equipment (UE) identifier (ID) information and identifying a UE based on signaled UE ID information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G, which may also be referred to as 5G New Radio (NR). 5G is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G may be based on the 4G Long Term Evolution (LTE) standard. There exists a need for further improvements in 5G technology. These improvements may also be applicable to other multi-access technologies and the telecommunication standards that employ these technologies.

A UE may be configured to communicate with a base station. In messages to the base station, the UE may include a UE ID so that the base station may identify which UE among a plurality of UEs is sending the messages. However, as the number of UEs in the plurality of UEs communicating with the base station increases, so too does the bandwidth used to communicate all of the UE IDs associated with this increased number of UEs. For example, for massive machine-type communication (mMTC), the number of UEs communicating with the base station may reach or exceed 1,000,000 UEs per square kilometer. In such an example, if the UE ID for each UE is 16 bits in length, 16,000,000 bits would need to be transmitted if each of the 1,000,000 UEs transmitted just a single message, and that is just counting the bandwidth consumption for the UE ID part of the messages being transmitted. Therefore, there remains a need to increase bandwidth consumption efficiency by, for example, reducing the amount of overhead required to identify a UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Communication systems, such as LTE and 5G communication systems, may provide massive UE access. For example, for mMTC, the number of UEs communicating with the base station may reach or exceed 1,000,000 UEs per square kilometer. Non-orthogonal multiple access (NOMA) may be used to address the issue of massive UE access in communication systems, such as LTE and 5G. However, NOMA may require a UE to notify the network of its UE ID, as there is no uplink grant. The communication of UE ID for a massive amount of UEs may require a large amount of overhead. Aspects presented herein reduce the overhead required for the UE to communicate the UE ID.

In an aspect of the disclosure, a method, a computer-readable medium, and an apparatus are provided. The apparatus may be configured to assign one or more resources to a group comprising a plurality of UEs that includes a first UE. The apparatus may be configured to receive, from the first UE, a message on the one or more assigned resources. The message may include a cyclic redundancy check (CRC) scrambled with a group identifier for the group comprising the plurality of UEs. The message may include an indication of a UE identifier for the first UE.

In another aspect of the disclosure, a method, a computer-readable medium, and an apparatus are provided. The apparatus may be configured to receive, from a base station, an indication of one or more assigned resources corresponding to a group comprising a plurality of UEs that includes the first UE and an indication of a group identifier corresponding to the group. The apparatus may be configured to send, to the base station, a message on the one or more assigned resources. The message may include a CRC scrambled with the group identifier for the group comprising the plurality of UEs. The message may include an indication of a UE identifier for the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
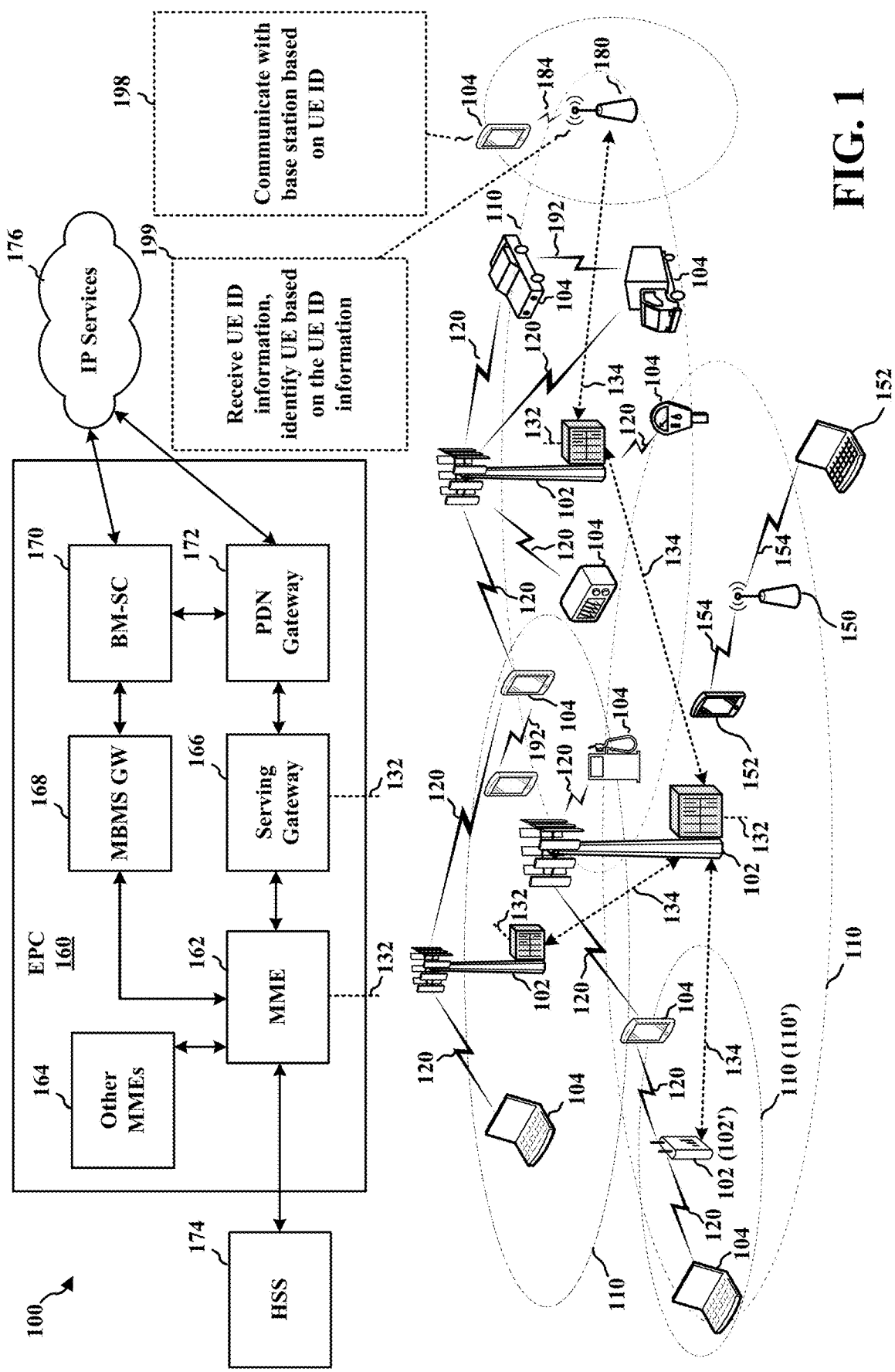
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or 5G.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ 5G and use the same 5 GHz unlicensed frequency spectrum as used by the Wi-Fi AP 150. The small cell 102', employing 5G in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to communicate UE ID information in accordance with the techniques described herein (198). For example, the UE 104 may communicate UE ID information to the base station 180, as described herein.

The base station 180 may receive UE ID information in accordance with the techniques described herein (199) and to use the UE ID information to identify the UE. For example, the base station 180 may receive UE ID information from the UE 104. In some examples, the base station 180 may receive a message from the UE 104 that comprises the UE ID information. The base station 180 may identify the UE that transmitted the message (e.g., the UE 104) based on the UE ID information included in the message. Upon identifying the sender of the message using the UE ID information, the base station 180 may send an acknowledgement (ACK) message to the sender. In some examples, the ACK message may indicate a positive acknowledgement or a negative acknowledgement (NACK). The UE 104 may receive the acknowledgement message and determine, based on the acknowledgement message, whether the base station 180 successfully received the message that triggered the base station 180 to send the acknowledgement message. For example, if the UE 104 determines that the base station 180 did not successfully receive the message, then the UE 104 may be configured to re-send the message to the base station 180.

The base station 180 may be configured to communicate with a plurality of UEs (e.g., a plurality of different UEs 104, as one example). When communicating with each UE of the plurality of UEs, the base station 180 may assign each UE an ID. The base station 180 may be configured to send each respective assigned UE ID to each respective UE of the plurality of UEs. In some examples, the assigned UE ID may include a Cell Radio Network Temporary Identity (C-RNTI). In other examples, the assigned UE ID may include a Temporary International Mobile Subscriber Identity (T-IMSI). In other examples, the assigned UE ID may include an ID different from C-RNTI or T-IMSI. In some examples, the base station 180 may assign a first type of ID (e.g., C-RNTI) to one or more UEs of the plurality of UEs and assign a second type of ID (e.g., T-IMSI) to one or more different UEs of the plurality of UEs. Otherwise described, the base station 180 may be configured to assign any type of ID to any UE. In some examples, each UE may send the base station 180 messages that include its respective UE ID assigned to it by the base station 180 so that the base station may identify from which UE among the plurality of UEs one or more messages was received. As an example, the UE 104 may be configured to send a message to the base station 180 that includes the UE ID assigned to it by the base station 180 so that the base station may, upon receiving the message, identify the UE 104 as the sender.

However, as the number of UEs in the plurality of UEs communicating with the base station 180 increases, so too does the bandwidth needed to communicate all of the UE IDs associated with the plurality of UEs. For example, for mMTC, the number of UEs communicating with the base station may reach or exceed 1,000,000 UEs per square kilometer. In such an example, if the UE ID for each UE among the 1,000,000 UEs is 16 bits in length, 16,000,000 bits would need to be transmitted if each of the 1,000,000 UEs transmitted just a single message, and that is just counting the bandwidth consumption for the UE ID part of the messages being transmitted.

Figure 12:
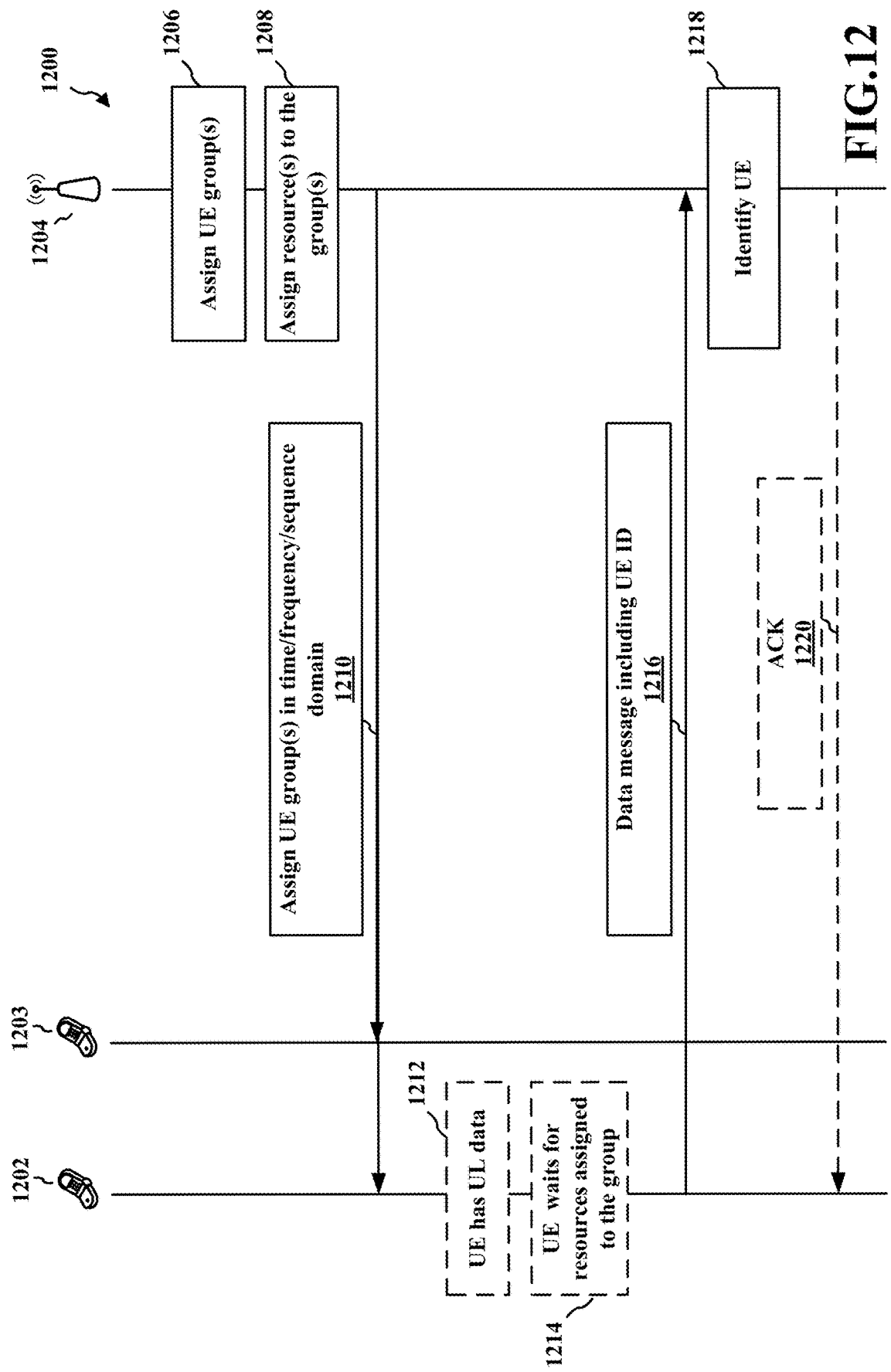
FIG. 12 illustrates an example flow diagram between a UE and a base station.

The techniques described herein improve bandwidth consumption efficiency by provide more efficient ways for a UE to identify itself as a sender of unscheduled uplink communication. For example, one or more examples herein may reduce the amount of information used to identify a UE (e.g., the UE ID data transmission overhead may be reduced). FIG. 12 illustrates an example communication flow 1200 between a base station 1204 and multiple UEs 1202, 1203. As an example, the base station 180 may be configured to assign each of the UEs to a group, e.g., at 1206. The base station 180 may associate a UE with a group. For example, a plurality of UEs may include a first UE, a second UE, and a third UE. The base station may assign the first UE to a first group, and the second and third UEs to a second group. The base station 180 may be configured to assign a group identifier (ID) to each respective group. For example, if three groups are respectively assigned to UEs within a plurality of UEs, the base station 180 may assign a first group ID to the first group of UEs, a second group ID to the second group of UEs, and a third group ID to the third group of UEs. In some examples, each assigned group ID may be a group specific Radio Network Temporary Identity (RNTI), such as Semi-Persistent Scheduling (SPS)-RNTI, SPS C-RNTI, or any other ID common to the group of UEs (meaning that each UE in the group is configured to receive the group specific ID that is common to all UEs within the group).

Each group may have resource(s) associated therewith. The resources may comprise time, frequency, and/or sequence resources. For example, the base station 180 may assign resources to each group, as illustrated at 1208. In some examples, at least some part of the assigned resource(s) assigned may be unique to a particular group. For example, resources assigned to a first group may be different than resources assigned to a second group. The base station 180 may be configured to send a message 1210 to the UE(s) to, for example, configure the UE(s) to operate on the resources associated with the group to which the UE(s) are assigned when communicating with the base station 180. The message 1210 may include an indication of the assigned resource(s) corresponding to the group to which the UE 104 is assigned. When a UE in an assigned group has uplink data, e.g., 1212, to transmit to the base station, the UE waits, at 1214, for the assigned resources in time and transmits the data message 1216 according to the assigned frequency resources, e.g., on a Physical Uplink Shared Channel (PUSCH) or Narrowband PUSCH (NPUSCH). Thus, the UE uses the assigned time/frequency resources to transmit the uplink data. The periodicity, and time/frequency offset of such time/frequency resources for the group of UEs may be configured by the base station. The assigned resources may further include a sequence, which the UE may use to transmit the data 1216. For example, different code(s) and/or sequence(s) may be assigned to different groups of UEs. The message may further include an indication of a group identifier corresponding to the group to which the UE 104 is assigned. For example, a group-common RNTI, such as an SPS-RNTI, may be allocated to each group of UEs. The group-common RNTI may be used by the UEs in the group for CRC scrambling of the uplink data 1216 transmitted to the base station. This may be helpful, e.g., for a grant-free scheme, such as SPS, where the UE transmits data without a specific uplink grant. The message may also include an indication of a UE ID for the UE 104. As the UE transmits the data using resources that are not specific to the UE, the inclusion of the UE ID enables the base station to identify, at 1218, the source of the uplink data transmission. After identifying the UE 1202, the base station is able to respond with an ACK 1220. As described supra, the overhead required for the UEs to indicate their UE ID to the base station along with data transmission 1216 can be very large and place a significant burden on the communication system. Aspects presented herein enable the UE to identify itself to the bases station with reduced resources. This reduces the overhead burden placed on the communication system. The indication of the group identifier (e.g., the group identifier or a representation of the group identifier), the indication of the UE ID (e.g., the UE ID or a representation of the UE ID), and/or the indication of the one or more resources assigned to the group to which the UE belongs may be used to reduce the amount of data needed to identify the UE. For example, the UE 104 may be configured to increase bandwidth consumption efficiency by being configured to use the indication of the group identifier (e.g., the group identifier or a representation of the group identifier), the indication of the UE ID (e.g., the UE ID or a representation of the UE ID), and/or the one or more resources assigned to the group to which the UE belongs as described herein.

As used herein, reference to a device (e.g., the UE 104 or the base station 180) being configured to signal information (e.g., UE ID information) may refer to the device being configured to transmit, communicate, or send the information. Similarly, reference to a device (e.g., the UE 104 or the base station 180) being configured to send information (e.g., UE ID information) may refer to the device being configured to transmit, communicate, or signal the information. For example, reference to the UE 104 being configured to signal UE capability information may include reference to the UE 104 being configured to transmit or otherwise send the UE capability information. In some examples, one or more of the following terms may be synonymous: "transmit," "communicate," "send," and/or "signal." As used herein, UE ID information may include or refer to an indication of a UE ID. For example, the UE 104 may be configured to signal UE ID information, the UE ID information being or otherwise including an indication of a UE ID corresponding to the UE 104.

Figure 2:
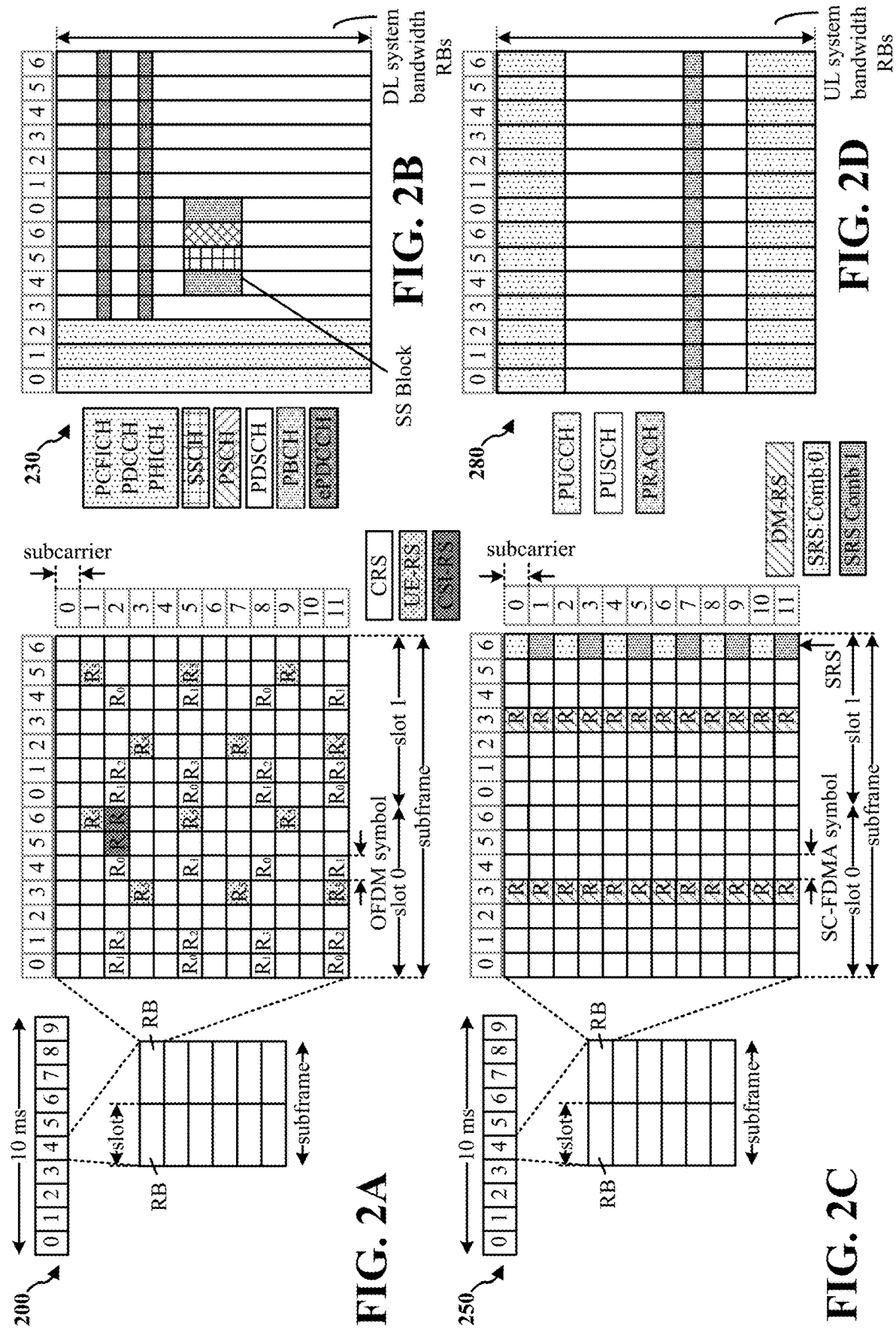
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
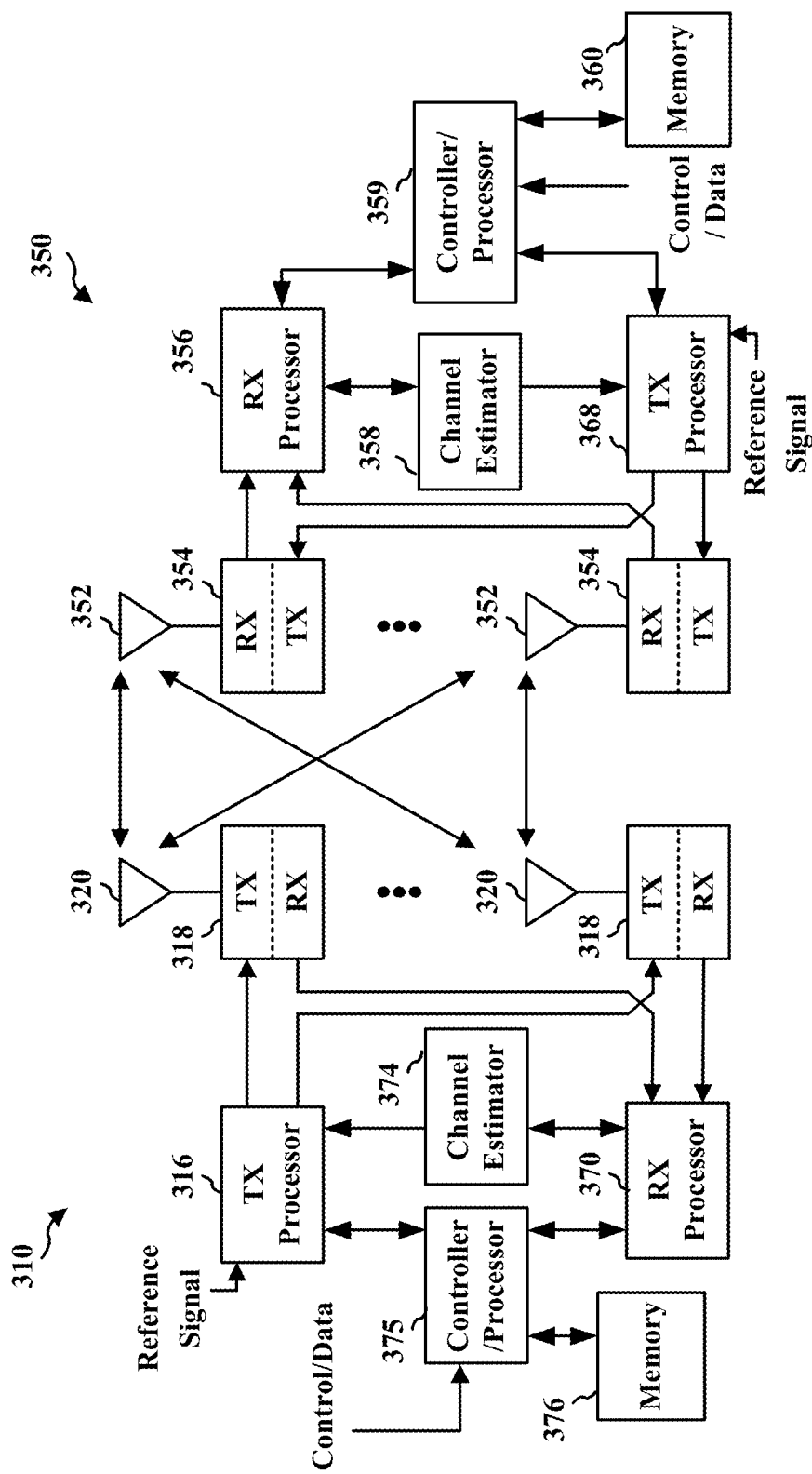
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The information provided to the RX processor 356 may include, for example, information transmitted by the base station 310. For example, the information provided to the RX processor 356 may include an indication of one or more resources corresponding to a group including a plurality of UEs and an indication of a group identifier corresponding to the group. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. In some examples, the program codes may include program codes for one or more functions described herein with respect to a UE. For example, the program codes may include program code for signaling UE ID information in accordance with the techniques described herein. The data may include UE ID information. The program codes may include program codes for performing other functions described herein, such as functions relating to the signaling of UE ID information. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The information provided to the RX processor 370 may include, for example, information transmitted by the UE 350. For example, the information provided to the RX processor 370 may include an indication of a UE ID. As another example, the information provided to the RX processor 370 may include a message including a cyclic redundancy check (CRC) scrambled with a group identifier and an indication of a UE ID.

The controller/processor 375 can be associated with a memory 376 that stores program codes and data. In some examples, the program codes may include program codes for one or more functions described herein with respect to a base station. For example, the program codes may include program code for assigning one or more resources to a group comprising a plurality of UEs in accordance with the techniques described herein. As another example, the program codes may include program code for sending an indication of the one or more assigned resources assigned to the group. In this example, the data may include the indication of the one or more assigned resources assigned to the group. The program codes may include program codes for performing other functions described herein. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
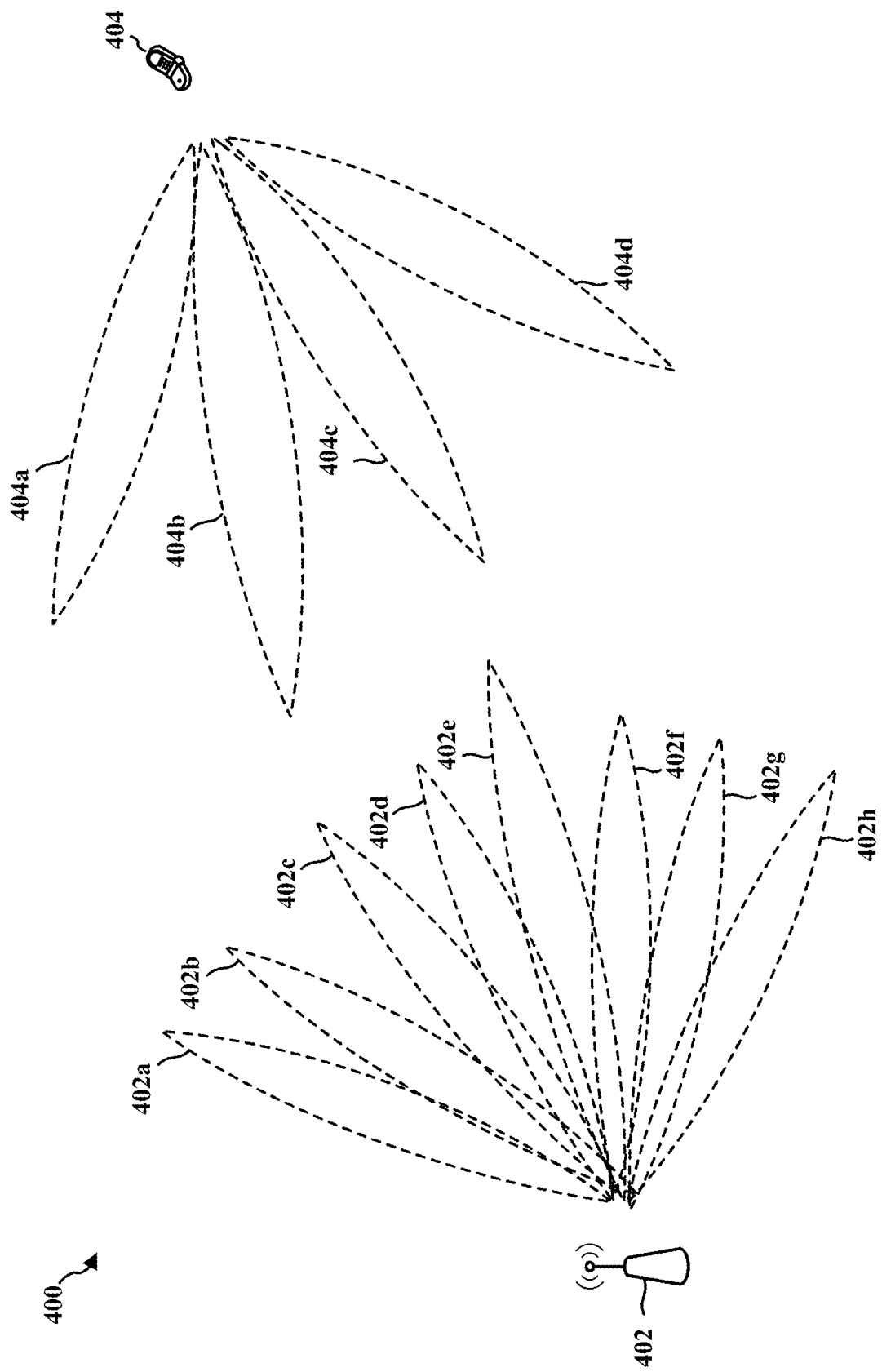
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. In some examples, the beamformed signal may carry an indication of one or more of one or more assigned resources corresponding to a group comprising a plurality of UEs and an indication of a group identifier corresponding to the group. The UE 404 may receive the beamformed signal from the base station 402 in one or more receive directions 404a, 404b, 404c, 404d. The UE 404 may also transmit a beamformed signal to the base station 402 in one or more of the directions 404a-404d. In some examples, the beamformed signal may carry UE ID information. For example, the beamformed signal may carry a message on one or more assigned resources. The message may include a cyclic redundancy check (CRC) scrambled with the group identifier for the group comprising the plurality of UEs. The message may include an indication of a UE identifier for the UE 404. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
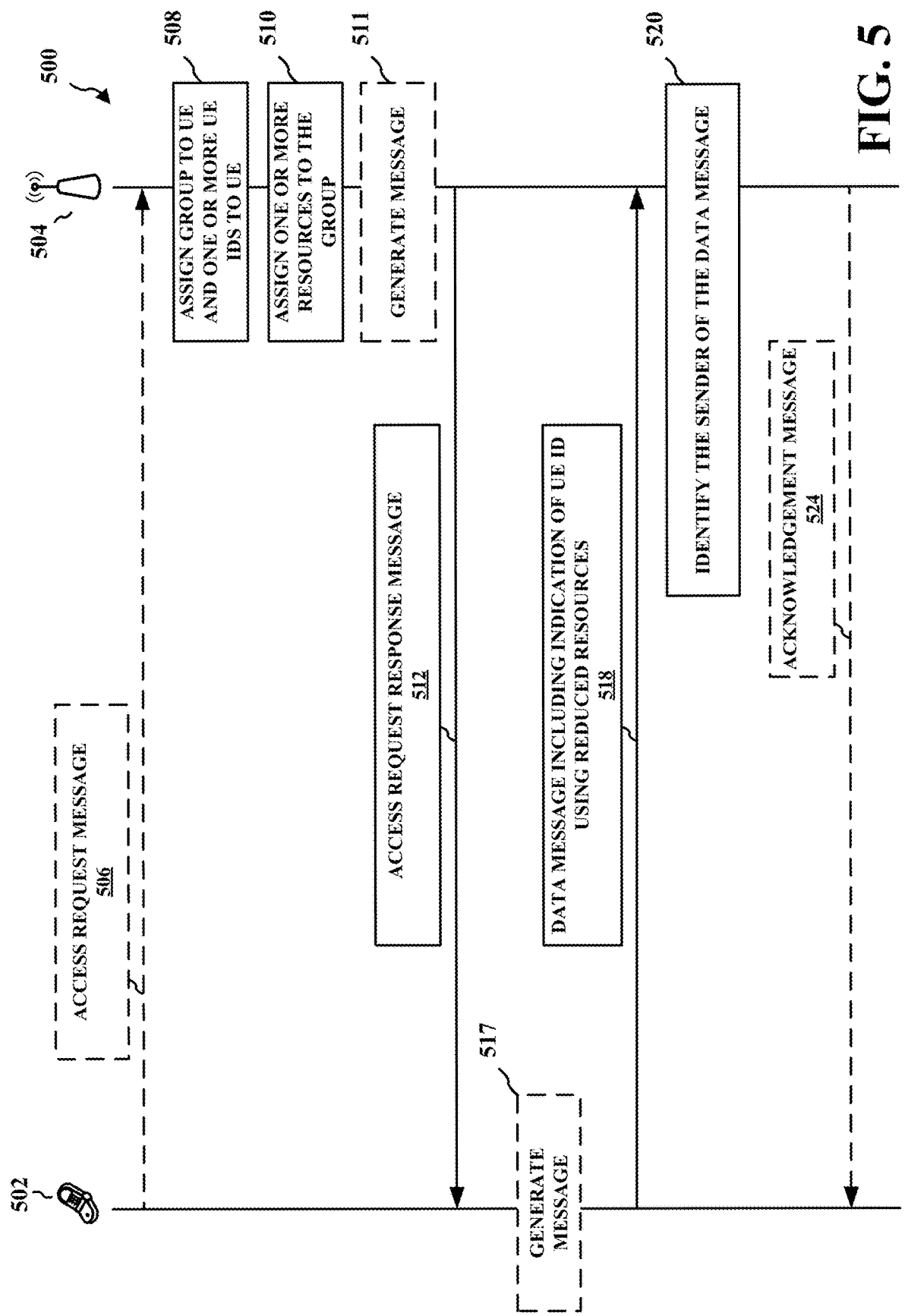
FIG. 5 illustrates an example flow diagram between a UE and a base station.

FIG. 5 illustrates an example flow diagram 500 between the UE 502 and the base station 504 in accordance with the techniques described herein. In other examples, one or more techniques described herein may be added to the flow diagram 500 and/or one or more techniques depicted in the flow diagram may be removed. The UE 502 may be any UE configured to perform one or more techniques described herein, e.g., UE 104, 350, 404, 1202, 1204, apparatus 802, 802'. Similarly, the base station 504 may be any base station configured to perform one or more techniques described herein, e.g., base station 102, 180, 310, 402, apparatus 1002, 1002'.

In the example of FIG. 5, the base station 504 may communicate with a plurality of UEs. The multiple access may be referred to as NOMA. However, the techniques described herein may apply to any multiple access implementation, whether or not NOMA. While only a single UE 502 is illustrated, the base station 504 may perform similar aspects in connection with other UEs.

In some examples, such as in a multiple access environment the base station 504 may receive uplink data from the UE without sending the UE a specific UL grant scheduling the UL transmission. Thus, the UE 502 may send an unscheduled transmission, e.g., 518, to the base station 504.

For example, the UE 502 may send a data message to the base station 504 on assigned resource(s) associated with a group to which the UE 502 belongs, such as described in connection with FIG. 12. Different groups may be assigned different resources in a time domain, frequency domain, and/or sequence domain. Because the transmission is unscheduled, the data message transmitted by the UE 502 must somehow indicate the sender. Otherwise, the base station 504 may successfully receive the data message but not be able to determine the sender of the message and/or respond to the sender. The techniques described herein enable the UE 502 to more efficiently identify itself as the sender of a data message to the base station 504.

At block 506, the UE 502 may send an access request message 506 to the base station 504. At block 508, the base station 504 may group UEs served by the base station. The base station may assign a group to the UE 502 and one or more UE IDs to the UE 502. The grouping and assignment may occur in response to the access request message 506. For example, the plurality of UEs with which the base station 504 may be configured to communicate may be assigned to a set of different groups. The UE 502 may be assigned to a first group whereas another UE of the plurality of UEs may be assigned to a second group. Each group may be associated with multiple UEs within the plurality of UEs. In some examples, the base station 504 may be configured to assign a group to the UE 502 using a group ID. Each group may comprise an associated group ID. The group ID may be indicated to the UE 502 along with the UE's assignment to the group.

In some examples, the base station 504 may generate and/or assign UE ID(s) to the UE 502. The UE IDs may include a first UE ID that is unique to the group to which the UE 502 is assigned. The first UE ID may be referred to as a UE ID within the group to which the UE 502 belongs; or, more simply, the UE ID corresponding to or associated with the group.

In other examples, the base station 504 may be configured to generate a second UE ID for identifying the UE 502. The second UE ID might not be associated with a group, meaning that the second UE ID might not be unique to a group. The second UE ID may have a bit length that is more than the combined bit length of both the group ID assigned to the UE 502 and the first UE ID. For example, the first UE ID may have a first bit length, the group ID may have a second bit length, and the second UE ID may have a third bit length, where: (first bit length+second bitlength)<third bit length. For example, the second UE ID may include a cell radio network temporary identity (C-RNTI), a Temporary International Mobile Subscriber Identity (T-IMSI), etc. For example, the UE 502 may be configured to use the first UE ID in a multiple access environment and the second UE ID in a legacy multiple access environment.

As used herein, reference to an indication of a UE ID may comprise the UE ID or a representation of the UE ID. For example, a representation of the UE ID may include an encoded version of the UE ID. Additionally, UE ID information may comprise an indication of a UE ID. Similarly, reference to an indication of a group ID may comprise the group ID or a representation of the group ID. For example, a representation of the group ID may include an encoded version of the group ID.

Time, frequency, and/or sequence resources may be associated with each. For example, at block 510, the base station 504 may assign one or more resources to each group of UEs. A group of UEs may refer to a plurality of UEs assigned to the same group. For example, a plurality of UEs may include 10 UEs (e.g., UEs 1-10). The base station may assign the UEs 1 and 3 to group 1; UEs 2, 4, and 5 to group 2; and UEs 6, 7, 8, 9, and 10 to group 3. Group 1 UEs may communicate with the base station using the resources assigned to group 1. Similarly, group 2 UEs may communicate with the base station using the resources assigned to group 2, and group 3 UEs may communicate with the base station using the resources assigned to group 3.

The resource(s) assigned to each group may be orthogonal to the resource(s) assigned to other groups. Thus, at least one resource assigned to each group may be unique to the group, e.g., orthogonal to any other group. For example, the resource(s) assigned to a first group may be different and non-overlapping (e.g., in frequency and/or in time) to the resource(s) assigned to a second group. As an example, the first group may be assigned a first transmission time slot from 0 to 6 ms and the second group may be assigned a second transmission time slot from 8 to 10 ms. These two time slots are different and may be regarded as orthogonal. As such, the first and second groups may be orthogonal even if other resources assigned to the first and second group are the same (e.g., an assigned frequency resource and/or sequence resource may be the same or overlap that of another group). For example, the first group may also be assigned a first frequency resource (e.g., a first frequency or first frequency range on which to transmit) and the second group may also be assigned a second frequency resource. As the two assigned time resources are different, the groups are orthogonal even if the first and second frequency resources are the same or overlap. Referring to the example of FIG. 5, the UE 502 may be assigned to a group having corresponding resources. Thus, the base station 504 may assign the corresponding resource(s) to the group to which the UE 502 belongs, which may be referred to as a first group.

Resources may refer to time domain, frequency domain, and sequence/code domain resources. For example, the first group of UEs including the UE 502 may be assigned periodic time domain resources. The periodic resources may be indicated by periodicity and duration. For example, the UEs assigned to the first group may use an allocated resource slot every certain number of slots. As an example, the first group of UEs may also be configured to use only a portion of available bandwidth to transmit information to the base station 504, such as using one 1 millisecond (ms) slot every 20 ms.

Time and/or frequency domain resources, periodicity, time, and/or frequency offset parameters may be unique to each group. For example, a first group may be assigned to use a first 1 ms slot among twenty 1 ms slots, and a second group of UEs may be assigned to use a second 1 ms slot among the twenty 1 ms slots. In some examples, the base station 504 may determine the group corresponding to a received message based on the resource(s) used to transmit the message, even without explicit transmission of a group identifier to the base station. In the example above, the base station 504 may determine that any message received in the first 1 ms corresponds to the first group, and any message received in the second 1 ms corresponds to the second group. For sequence/code domain resources, different sequence(s)/code(s) may be assign to different UE groups.

As used herein, a resource assigned to a group may include any transmission resource that a UE may be configured to use to transmit a message.

A group and a UE may be associated with each other, whether the group is assigned to the UE or the UE is assigned to the group. Similarly, resources may be associated with a group, whether the resources are assigned to the group or the group is assigned to the resources.

At block 511, the base station 504 may generate a message (e.g., an access request response message) based on information received from the UE 502. The message may be generated and sent to the UE, at 512, in response to a access request message 506. As described herein, the message generated at 511 and transmitted by the base station 504 to the UE 502 may include various information. For example, the message may include an indication of a UE ID. While examples below refer to an access request response message, other examples of messages may also be generated and sent in accordance with the techniques described herein.

The message 512 (e.g., access request response message) may be sent to the UE 502 to configure the UE 502 to use the resource(s) associated with the UE's assigned group when communicating with the base station 504. The message may include an indication of the assigned resource(s) corresponding to the group to which the UE 502 is assigned, and may include an indication of a group identifier for the group to which the UE 502 is assigned. The group identifier may be a group specific RNTI. The message may also include an indication of a UE ID for the UE 502. The indication of the group identifier, the indication of the UE ID, and/or the indication of the resource(s) assigned to the group to which the UE belongs may reduce the amount of data needed for the UE to identify itself to the UE. For example, bandwidth consumption efficiency may be improved through the use of the group identifier, the indication of the UE ID, and/or the resource(s) assigned to the group to which the UE belongs to identify the UE as the sender of unscheduled data.

At block 517, the UE 502 may generate a message (e.g., a data message) for transmission to the base station. The message may be generated based on information received from the base station 504. The UE may generate the message for an unscheduled transmission to the bases station. In some examples, the UE 502 may be configured to wait until the resource(s) assigned to the group with which the UE is associated become available to transmit the message to the base station 504. As the message may be unscheduled, without a specific uplink grant from the base station, the message transmitted by the UE 502 may include an indication of a UE ID.

At block 518, the UE 502 may send the message (e.g., the message generated at block 517, such as a data message) to the base station 504 according to the techniques described herein. While examples below refer to a data message, other examples of messages may also be generated and sent in accordance with the techniques described herein.

The message may include a CRC scrambled with a group ID assigned to the group to which the UE 502 belongs, and an indication of a UE ID for the UE 502. For example, the UE 502 may scramble the CRC for the message with the group ID by concatenating the group ID to the information in the message for which a CRC is to be generated, resulting in a CRC scrambled with the group ID. In some examples, the indication of the UE ID may be included in a sub-header of the data message. In such examples, the indication of the UE ID may include the UE ID or a representation of the UE ID, such as an encoded version of the UE ID. The sub-header may comprise a Medium Access Control (MAC) header. In such an example, the UE 502 may be configured to transmit the indication of the UE ID to the base station 504 in a MAC header of the data message.

In other examples, the message 518 may include a Demodulation Reference Signal (DMRS). A DMRS generally refers to a reference signal used for helping a base station perform channel estimation and/or decode an uplink transmission received from a UE. The DMRS comprised in the message 518 may enable the base station 504 to perform channel estimation and/or decode an uplink transmission received from the UE 502. However, the DMRS may also be used to carry the indication of the UE ID corresponding to UE 502. For example, the indication of the UE ID may be represented by a sequence of the DMRS. As an example, the sequence of the DMRS may be unique to the UE 502 within the group to which the UE 502 is assigned, which may enable the base station 504 to identify the UE 502 as the sender of the data message. In such an example, the UE 502 may transmit the indication of the UE identifier to the base station 504 in the message, encoded or otherwise represented, as a DMRS sequence unique to the UE 502. The DMRS sequence may be unique to the UE within the group to which the UE 502 is assigned. The group may be indicated through the resources used to transmit the DMRS. Therefore, the base station 504 may identify the UE through a combination of the resources used to transmit a message and the DMRS sequence included or otherwise associated with the message, without explicit signaling of a UE ID. The base station may identify the group based on the resources used to transmit the message and may identify the UE from within the group based on the DMRS sequence comprised in the message. The message may include an indication of a UE ID that is explicitly signaled or implicitly signaled. In both examples, the message may carry an indication of a UE ID.

In some examples, the UE 502 may send the data message over an uplink control channel. The uplink control channel may include Physical Uplink Control Channel (PUCCH) or another uplink control channel.

In some examples, the UE ID corresponding to the UE 502 may be specific to the group to which the UE 502 is assigned. In such examples, the data message may or may not include an indication of the group ID corresponding to the group to which the UE 502 is assigned. In an example where the data message does not include an indication of the group ID, then the base station 504 may determine the group ID for the UE 502 based on the assigned resource(s) used by the UE 502 to communicate the message. Based the indication of the UE ID in the data message and the group ID derived from the assigned resource(s) used to transmit the data message, the base station 504 may identify the UE 502 as the sender of the data message. In an example where the data message does includes an explicit indication of the group ID, then the base station 504 may identify the UE 502 as the sender of the data message based on the indication of the UE ID and the indication of the group ID in the data message.

In some examples, the indication of the UE ID included in the data message may be different from the indication of the UE ID included in the access response message. For example, the indication of the UE ID included in the data message may be a representation of the UE ID (e.g., an encoded version of the UE ID), whereas the indication of the UE ID included in the access response message may be the UE ID. In an example where the indication of the UE ID comprises an encoded version of the UE ID, the UE 502 may generate the encoded version of the UE ID. In some examples, the encoded version of the UE ID may be run-length encoded. In other examples, the UE 502 may generate the encoded version of the UE ID based on the UE ID corresponding to the indication of the UE ID and the group ID received in the access request response message. For example, the UE 502 may input a concatenation of the UE ID corresponding to the indication of the UE ID and the group ID received in the access request response message into a hashing function to generate a hash value.

In one example, the UE ID corresponding to the indication of the UE ID received in the access request response message may be specific to the group to which the UE 502 is assigned. In such an example, the hash value may constitute the encoded version of the UE ID. The base station 504 may be configured with a memory that stores a hash table that maps hash values to UE IDs corresponding to different groups. For example, a simplified example may include a hash value of 1 mapping to UE ID 1 corresponding to group 1, a hash value of 2 mapping to UE ID 2 corresponding to group 1, a hash value of 3 mapping to UE ID 1 corresponding to group 2, and a hash value of 4 mapping to UE ID 2 corresponding to group 2.

In another example, the UE ID corresponding to the indication of the UE ID received in the access request response message may not be specific to any group assignments, such as the group assigned to the UE 502. Instead, the UE ID may include, for example, a C-RNTI, a T-IMSI, or any other non-group specific identifier. In this example, while the UE ID may not be group specific, the UE 502 is still assigned to a particular group. By concatenating the non-group specific UE ID with a group ID and inputting the concatenation into a hashing function, the UE 502 may be configured to generate a group specific UE ID that is encoded. As the non-group specific UE ID is hashed with a group ID, the hash becomes group specific and may have a smaller bit length than the combined bit length of the non-group specific UE ID and the group ID. Additionally, hashing the non-group specific UE ID with the group ID may prevent or reduce hash table collisions. In such an example, the hash value may constitute an encoded version of the UE ID. The base station 504 may comprise a memory that stores a hash table that maps hash values to UE IDs corresponding to different groups. For example, a simplified example may include a hash value of 1 mapping to UE ID 1 corresponding to group 1, a hash value of 2 mapping to UE ID 2 corresponding to group 1, a hash value of 3 mapping to UE ID 1 corresponding to group 2, and a hash value of 4 mapping to UE ID 2 corresponding to group 2.

Referring to block 520, the base station 504 may identify the sender of the data message. Once the sender of the data message is identified, at block 524, the base station 504 may send an acknowledgement message to the sender of the data message in response to the data message. The acknowledgement message may be an ACK indicating that the base station 504 successfully received the data message.

In an example where the data message includes an indication of a UE ID and an indication of a group ID to which the sender of the data message is assigned, the base station 504 may identify the sender of the data message as the UE corresponding to the UE ID in the group corresponding to the group ID in indicated in the data message, such as in a sub-header (e.g., MAC header) of the data message.

In an example where the data message includes an indication of a UE ID and not an indication of a group ID to which the sender of the data message is assigned, the base station 504 may determine the group ID corresponding to the group to which the UE sender is assigned based on the assigned resource(s) used by the sender to communicate the data message. Based the indication of the UE ID in the data message and the group ID derived from the resource(s) used to transmit the data message, the base station 504 may identify the sender (e.g., the UE 502) as the sender of the data message. For example, the data message may include an indication of a UE ID in a sub-header of the data message or as a DMRS sequence. However, without the group ID, the indication of the UE ID alone may identify more than one UE. For example, a plurality of UEs may be grouped into two or more groups (e.g., 2, 3, 4, 5, 10, 100, 1000, or more groups). A UE ID may be specific to a group such that the UE ID is not re-used. However, in another example, the same UE ID may be assigned to another UE in another group. Therefore, to identify the sender of the data message, the base station 504 may need to determine, based on other information, a group ID corresponding to a group to which the sender of the data message is assigned. In some examples, the group may be identified based on the resource(s) used to transmit the data message because the resource(s) are uniquely assigned to each group. For example, the base station may determine a particular group corresponding to resource(s) used to transmit the data message.

In another example where the indication of the UE ID included in the data message received by the base station 504 is an encoded version of the UE ID, the base station 504 may decode the encoded version of the UE ID to identify the UE ID and the group ID corresponding to the group to which the sender of the data message is assigned. For example, the base station 504 may comprise a memory that stores a hash table that maps hash values to UE IDs corresponding to different groups. For example, a simplified example may include a hash value of 1 mapping to UE ID 1 corresponding to group 1, a hash value of 2 mapping to UE ID 2 corresponding to group 1, a hash value of 3 mapping to UE ID 1 corresponding to group 2, and a hash value of 4 mapping to UE ID 2 corresponding to group 2.

As described above, once the sender of the data message is identified, the base station 504 may be configured to send an acknowledgement message to the sender, such as UE 502 in the example of FIG. 5.

Figure 6:
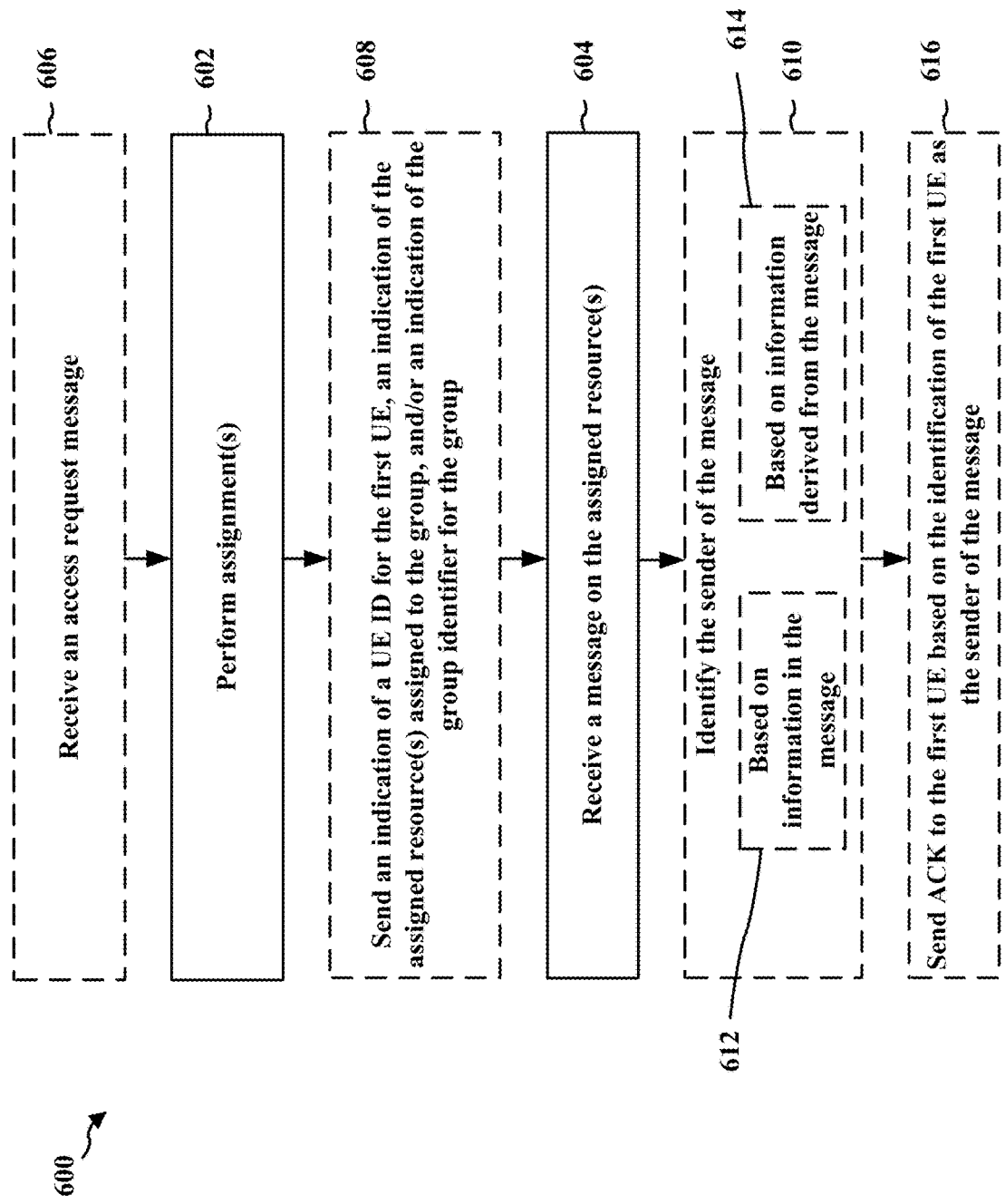
FIG. 6 is a flowchart of a method of wireless communication.

FIG. 6 is a flowchart 600 of a method of wireless communication. The method may be performed by a base station (e.g., base station 102, 180, 310, 402, 504, 850, 1204, apparatus 1002, 1002'). Optional aspects are illustrated with a dashed line. In some examples, the method illustrated in flowchart 600 may include one or more function described herein (e.g., one or more functions described with respect to FIG. 5) that are not illustrated in FIG. 6, and/or may exclude one or more illustrated functions.

At block 602, the base station may perform one or more assignments. For example, the base station may assign one or more resources to a group, the group including a plurality of UEs that includes a first UE, such as described in connection with 510, 512, and 1208, 1210. For example, the base station may group UEs into a plurality of groups. Then, the base station may assign resources, in time, frequency, and/or sequence, to each of the plurality of groups. In other examples, the base station may assign one or more UE IDs to the first UE and assign a group ID to the first UE, where the group ID corresponds to a particular group (e.g., a group of UEs), such as described in connection with 508 in FIG. 5. In some examples, the base station may receive an access request message, e.g., 506, from the first UE, as shown at block 606. In such examples, the base station may perform the one or more assignments in response to receiving the access request message from the first UE. Thus, the base station may send an indication of any of the assigned resource(s), the assigned group identifier, and/or the UE identifier to the UE, at 608, in response to the access request message received at 606.

At block 604, the base station may receive, from the first UE, a message on the one or more assigned resources. The message may include a CRC scrambled with a group ID for the group including the plurality of UEs that includes the first UE, and an indication of a UE ID for the first UE. The message may include data, e.g., as described in connection with 518, 1216. For example, the message may be an unscheduled data message. In some examples, the group ID may be an RNTI.

In one example, the indication of the UE ID may be included in a sub-header of the message. The sub-header may comprise a MAC Control Element (CE). The indication of the UE identifier may comprise the UE identifier or an encoded version of the UE identifier.

Figure 13:
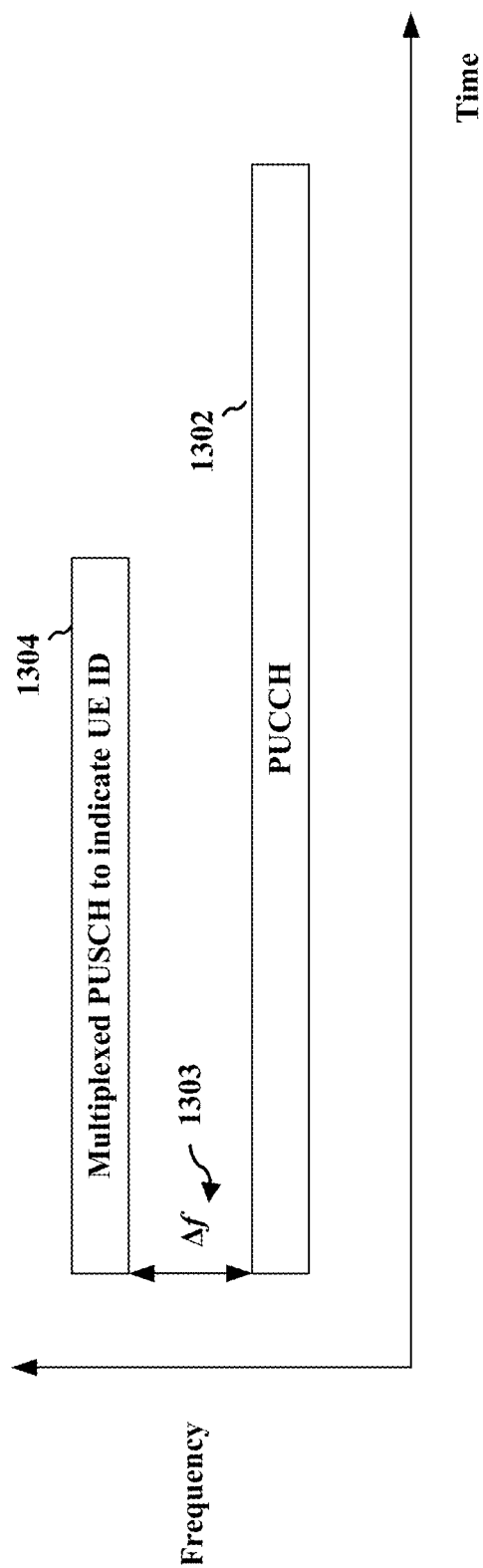
FIG. 13 illustrates an example frequency shift for identifying a UE.

In another example, the indication of the UE ID may be carried in an uplink control channel, e.g., PUCCH. For example, a frequency multiplexed PUSCH may be introduced in order to carry the UE ID. FIG. 13 illustrates an example of a PUCCH 1302 with a multiplexed PUSCH 1304 that indicates a UE ID using a frequency shift 1303, Δf, of the PUSCH from the PUCCH. A unique frequency shift may be configured by the base station for each of the UEs, e.g., in RRC signaling. The frequency shift may be unique to the UEs within a particular UE group. The base station may use the frequency shift at which PUSCH from the UE is multiplexed in relation to PUCCH in order to identify the UE transmitting the PUSCH.

In other examples, the indication of the UE ID may correspond to a specific DMRS sequence corresponding to the message, as described in additional detail infra. For example, the message received at 604 may comprise a DMRS, and the indication of the UE identifier may be represented by a sequence of the DMRS. Thus, the base station may identify the UE, at 610, based on the DMRS sequence in the message from the UE.

The indication of the UE ID may include the UE ID or an encoded version of the UE ID. In some examples, the base station may send an indication of a UE ID for the first UE, an indication of the resource(s) assigned to the group to which the first UE is assigned, and/or an indication of the group identifier for the group to which the first UE is assigned, as shown at block 608. In such examples, the base station may send these indication(s) in a message to the first UE, such as an access request response message.

At block 610, the base station may identify the sender of the message, e.g., based on at least one of: information included in the message (block 612) and/or information derived from the message (block 614). Examples of identifying the sender are described in connection with 520 in FIG. 5 and 1218 in FIG. 12.

In some examples, the message received at block 604 may include an indication of a UE ID and an indication of a group ID. In such examples, the base station may identify the sender of the message based on the indication of a UE ID and the indication of a group ID included in the message. For example, while a UE ID may not be UE-specific, the UE ID in conjunction with the group ID may operate together to uniquely identify the sender of the message. In an example in which 32 UEs are served by one cell, the UEs may be grouped into 4 UE groups, each UE group having up to 8 UEs. For example, the 4 UE groups can be uniquely identified using 2 bits. Then, the 8 UEs within the group can be uniquely identified within the group with a UE ID of three bits. Thus, if the UE indicates both its UE group with 2 bits and the UE ID within the group with 3 bits, the signaling in this example requires 5 bits. The grouping may potentially reduce the number of bits needed to identify each UE through the use of a group ID and a UE ID within the group. As the number of UEs served by the base station increases, the overhead saving may also increase. Additionally, this enables UEs to be grouped together. In one example, the UEs may be grouped based, at least in part, on UE capability.

In other examples, the message received at block 604 may include a DMRS, where the indication of the UE ID may be represented by a sequence of the DMRS. For example, the sequence of the DMRS may be unique to the first UE within the group. The base station may include a data structure stored in memory that maps DMRS sequences to UE IDs. For example, the base station may receive the sequence of the DMRS as part of the message at block 604, and may determine a UE ID corresponding to the first UE based on the DMRS sequence by determining which UE ID in the data structure (e.g., a table or two dimensional array) corresponds to the DMRS sequence. The base station may derive a group ID corresponding to the first UE based on the resource(s) used to transmit the message to the base station.

In other examples, the message received at block 604 may include an indication of the UE ID without an indication of a group ID corresponding to the group to which the sender is assigned. The base station may be configured to derive (e.g., determine) the group ID based on the resource(s) used to transmit the message to the base station. Then, the base station may identify the first UE from within the group based on the indication of UE included in the message. In the example of a cell serving 32 UEs, a UE ID may need to be 5 bits in order to identify the 32 UEs. However, if the UEs are grouped into 4 UE groups, each UE group having up to 8 UEs, then the number of bits needed to identify each UE can be reduced. If the groups are each assigned a different set of resources in time, frequency, and/or sequence, then the base station can infer the UE group based on the resources used to receive the data. Then, the UE may include only a UE ID within the group. A UE can be uniquely identified from among the 8 UEs in the group with a 3 bit UE ID. Thus, the number of bits to identify the UE in the cell may be reduced from 5 to 3. As the number of UEs served by the base station increases, the overhead saving also increases.

In some examples, the indication of the UE ID may be represented by a sequence of the DMRS. For example, the sequence of the DMRS sequence may be unique to the first UE and/or may be unique to the first UE within the group into which the UE is grouped. The base station may build a mapping between DMRS sequences and UE indexes, e.g., within a group. The mapping may comprise a 1:1 mapping. Each UE may be assigned with a UE specific DMRS sequence, e.g., via RRC signaling from the base station. In one example, the different DMRS sequences may be based on different base Constant Amplitude Zero Autocorrelation (CAZAC) sequences. In another example, the different DMRS sequences may be based on different cyclic shifts. In another example, the different DMRS sequences may be based on different Orthogonal Cover Codes (OCC). The base station may include a data structure stored in memory that maps DMRS sequences to UE IDs. For example, the base station may receive the sequence of the DMRS as part of the message at block 604, and may determine a UE ID corresponding to the first UE based on the DMRS sequence by determining which UE ID in the data structure (e.g., a table or two dimensional array) corresponds to the DMRS sequence. The base station may be configured to derive (e.g., determine) a group ID corresponding to the first UE based on the one or more resources used to transmit the message to the base station.

In some examples, the indication of the UE ID may be represented by an encoded version of the UE ID. The base station may decode the encoded version of the UE ID to identify the first UE, in order to identify the sender of the message at 610. For example, the UE may generate a short length identifier through a mapping based on a group ID and a UE C-RNTI. The encoded version of the UE ID may be a hash value generated based on the UE ID corresponding to the first UE and the group ID corresponding to the group to which the first UE is assigned. In one example, the UEs served by a cell may be grouped into 4 UE groups, each having 16 UEs. The 16 UEs may be uniquely identified from within the groups using a 4 bit identifies. For example, for a first group having 4 bits $[b_1 b_2 b_3 b_4]$, a hash function for the first UE group, $F_1$, may be defined as:

$$F_1(b_1 b_2 b_3 b_4) = [b_1 + b_2, b_2 + b_3, b_3 + b_4]$$

so that the 4 bits to identify the 16 UEs is compressed to 3 bits. Different groups may have different defined hash functions. For example, a hash function for a second UE group, $F_2$, may be defined as $$F_2(b_1 b_2 b_3 b_4) = [b_1 + b_4, b_2 + b_3, b_3 + b_4].$$

At block 616, the base station may send an acknowledgement message to the first UE based on the identification of the first UE as the sender of the message.

Figure 7:
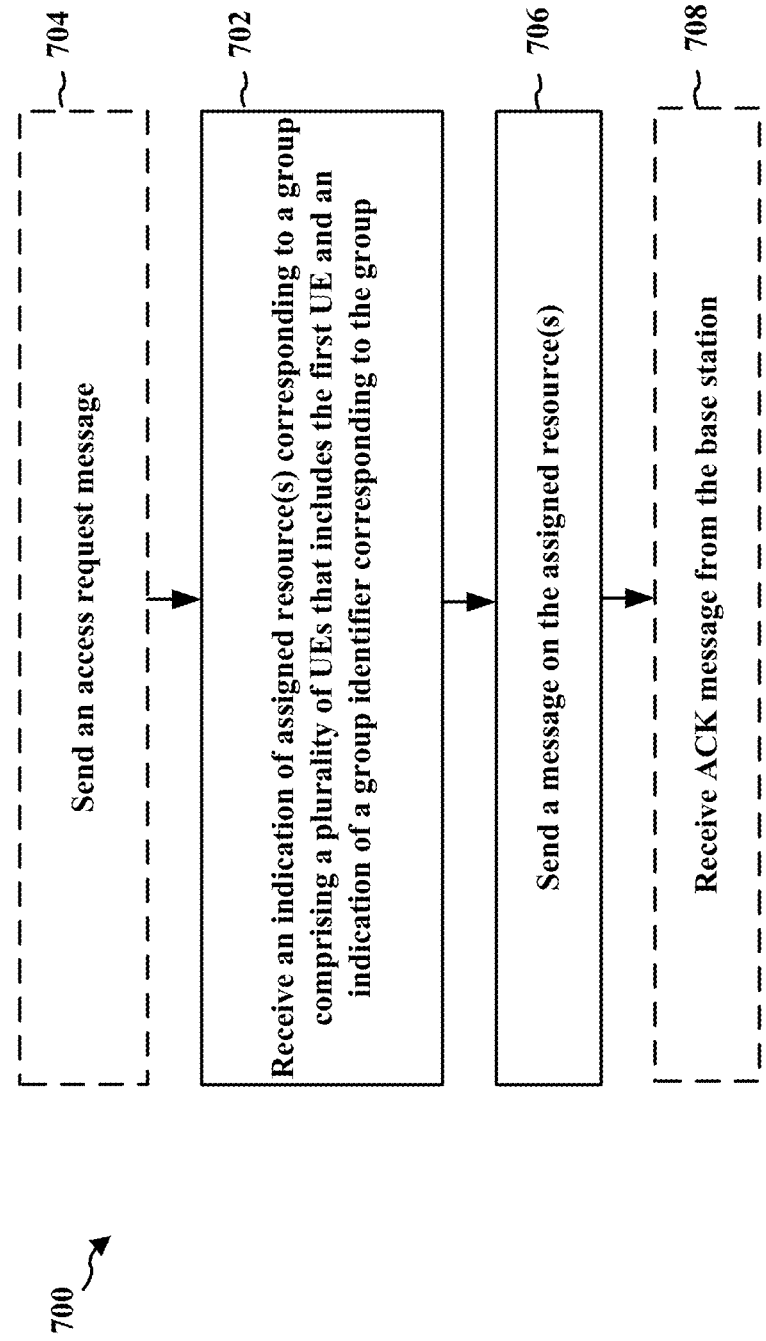
FIG. 7 is a flowchart of a method of wireless communication.

FIG. 7 is a flowchart 700 of a method of wireless communication. The method may be performed by a first UE (e.g., UE 104, UE 350, UE 404, UE 502, apparatus 802, 802'). In some examples, the method illustrated in flowchart 700 may include one or more functions described herein (e.g., one or more functions described with respect to FIG. 5) that are not illustrated in FIG. 7, and/or may exclude one or more illustrated functions. Optional aspects are illustrated with a dashed line.

At block 702, the first UE may receive, from a base station, an indication of the assigned resource(s) corresponding to a group of a plurality of UEs that includes the first UE and an indication of a group identifier corresponding to the group. In some examples, the first UE may send an access request message to the base station, as shown at block 704. In such examples, the UE may receive the indication of the resources and/or identifier(s), at 702, in an access request response message in response to the access request message. The access request response message may include one or more assigned resources corresponding to the UE's assigned, an indication of a group identifier corresponding to the UE's assigned group, and/or identifier information for the UE within the group. For example, the first UE may receive the indication of the assigned resource(s) corresponding to the group and an indication of a group identifier corresponding to the group in an access request response message from the base station.

At block 706, the first UE may send, to the base station, a message on the assigned resource(s). The message may include data, e.g., as described in connection with 518, 1216. For example, the message may comprise an unscheduled data message. The message may be sent at 706 on the assigned resource(s) in response to the access request response message, e.g., received at 702. The message may include a CRC scrambled with a group ID for the group, and an indication of a UE ID for the first UE. In some examples, the group ID may comprise an RNTI.

In one example, the indication of the UE ID may be included in a sub-header of the message. The sub-header may be a MAC header, e.g., a MAC CE.

In another example, the indication of the UE ID may be carried in an uplink control channel, e.g., PUCCH. For example, a frequency multiplexed PUSCH may be introduced in order to carry the UE ID. FIG. 13 illustrates an example of a PUCCH 1302 with a multiplexed PUSCH 1304 that indicates a UE ID using a frequency shift 1303, Δf, of the PUSCH from the PUCCH. A unique frequency shift may be configured by the base station for each of the UEs, e.g., in RRC signaling. The frequency shift may be unique to the UEs within a particular UE group. The base station may use the frequency shift at which PUSCH from the UE is multiplexed in relation to PUCCH in order to identify the UE transmitting the PUSCH.

In another example, the message sent at 706 may include a DMRS, and the indication of the UE ID may be represented by a sequence of the DMRS. Thus, the UE ID may correspond to a specific DMRS sequence that is provided to the UE from the base station, e.g., in the indication received at 702. For example, the sequence of the DMRS sequence may be unique to the first UE and/or may be unique to the first UE within the group into which the UE is grouped. The base station may build a mapping between DMRS sequences and UE indexes, e.g., within a group. The mapping may comprise a 1:1 mapping. Each UE may be assigned with a UE specific DMRS sequence, e.g., via RRC signaling from the base station. In one example, the different DMRS sequences may be based on different base CAZAC sequences. In another example, the different DMRS sequences may be based on different cyclic shifts. In another example, the different DMRS sequences may be based on different Orthogonal Cover Codes (OCC). The base station may include a data structure stored in memory that maps DMRS sequences to UE IDs. The message sent at 706 may include DMRS according to a DMRS assigned to the UE by the base station. This enables the base station to determine a UE ID corresponding to the first UE based on the DMRS sequence by determining which UE ID in the data structure (e.g., a table or two dimensional array) corresponds to the DMRS sequence. The base station may derive (e.g., determine) a group ID corresponding to the first UE based on the resource(s) used to transmit the message to the base station and to identify the UE from within the group based on the DMRS sequence.

In some examples, the UE ID corresponding to the first UE may be specific to the group. In some examples, the UE may indicate both the group ID and the UE ID in the message. For example, while a UE ID may not be UE-specific, the UE ID in conjunction with the group ID may operate together to uniquely identify the sender of the message. For example, the UEs may be grouped into 4 UE groups, each UE group having up to 8 UEs, then the number of bits needed to identify each UE can be reduced through the use of a group ID and a UE ID within the group. For example, the 4 UE groups can be uniquely identified using 2 bits. Then, the 8 UEs within the group can be uniquely identified within the group with a UE ID of three bits. Thus, if the UE indicates both its UE group with 2 bits and the UE ID within the group with 3 bits, the signaling requires 5 bits. Depending on the number of UEs, this manner of identifying the UE may provide a reduction in the number of bits. As the number of UEs served by the base station increases, the overhead saving also increases.

In another example, the message might not include an indication of the group ID. In this example, the UE may use the resources on which the UE transmits the data to indicate the group ID to the base station. The base station may derive (e.g., determine) a group ID corresponding to the first UE based on the one or more resources used to transmit the message to the base station, as described in connection with 520 and 1218. In the example of a cell serving 32 UEs, a UE ID may need to be 5 bits in order to identify the 32 UEs. However, if the UEs are grouped into 4 UE groups, each UE group having up to 8 UEs, then the number of bits needed to identify each UE can be reduced. If the groups are each assigned a different set of resources in time, frequency, and/or sequence, then the base station can infer the UE group based on the resources used to receive the data. Then, the UE may include only a UE ID within the group. A UE can be uniquely identified from among the 8 UEs in the group with a 3 bit UE ID. Thus, the number of bits to identify the UE in the cell may be reduced from 5 to 3. As the number of UEs served by the base station increases, the overhead saving also increases.

In some examples, the indication of the UE ID included in the message may comprise an encoded version of the UE ID. In such examples, the first UE may generate the encoded version of the UE ID based on an indication of the UE ID, e.g., a C-RNTI for the UE, received from the base station. The first UE may generate the encoded version of the UE ID by inputting the indication of the UE ID (e.g., the UE ID or a representation of the UE ID) and the group ID into a hashing function resulting in an encoded version of the UE ID (e.g., a hash value based on the UE ID and the group ID). For example, the first UE may concatenate the indication of the UE ID with the group ID, and input this concatenation into the hashing function. The base station may be configured with a memory that stores a hash table that maps hash values to UE IDs corresponding to different groups. For example, a simplified example may include a hash value of 1 mapping to UE ID 1 corresponding to group 1, a hash value of 2 mapping to UE ID 2 corresponding to group 1, a hash value of 3 mapping to UE ID 1 corresponding to group 2, and a hash value of 4 mapping to UE ID 2 corresponding to group 2. For example, the UE may generate a short length identifier through a mapping based on a group ID and a UE C-RNTI. In one example, the UEs served by a cell may be grouped into 4 UE groups, each having 16 UEs. The 16 UEs may be uniquely identified from within the groups using a 4 bit identifies. For example, for a first group having 4 bits $[b_1 b_2 b_3 b_4]$, a hash function for the first UE group, $F_1$, may be defined as:

$$F_1(b_1b_2b_3b_4)=[b_1+b_2,b_2+b_3,b_3+b_4]$$

so that the 4 bits to identify the 16 UEs is compressed to 3 bits. Different groups may have different defined hash functions. For example, a hash function for a second UE group, $F_2$, may be defined as $$F_2(b_1b_2b_3b_4)=[b_1+b_4,b_2+b_3,b_3+b_4].$$

At block 708, the first UE may receive an acknowledgement message from the base station. For example, after the base station receives a data message from the first UE, the base station may be configured to identify the sender of the data message. Upon identifying the first UE as the sender, the base station may send the acknowledgement message to the first UE.

Figure 8:
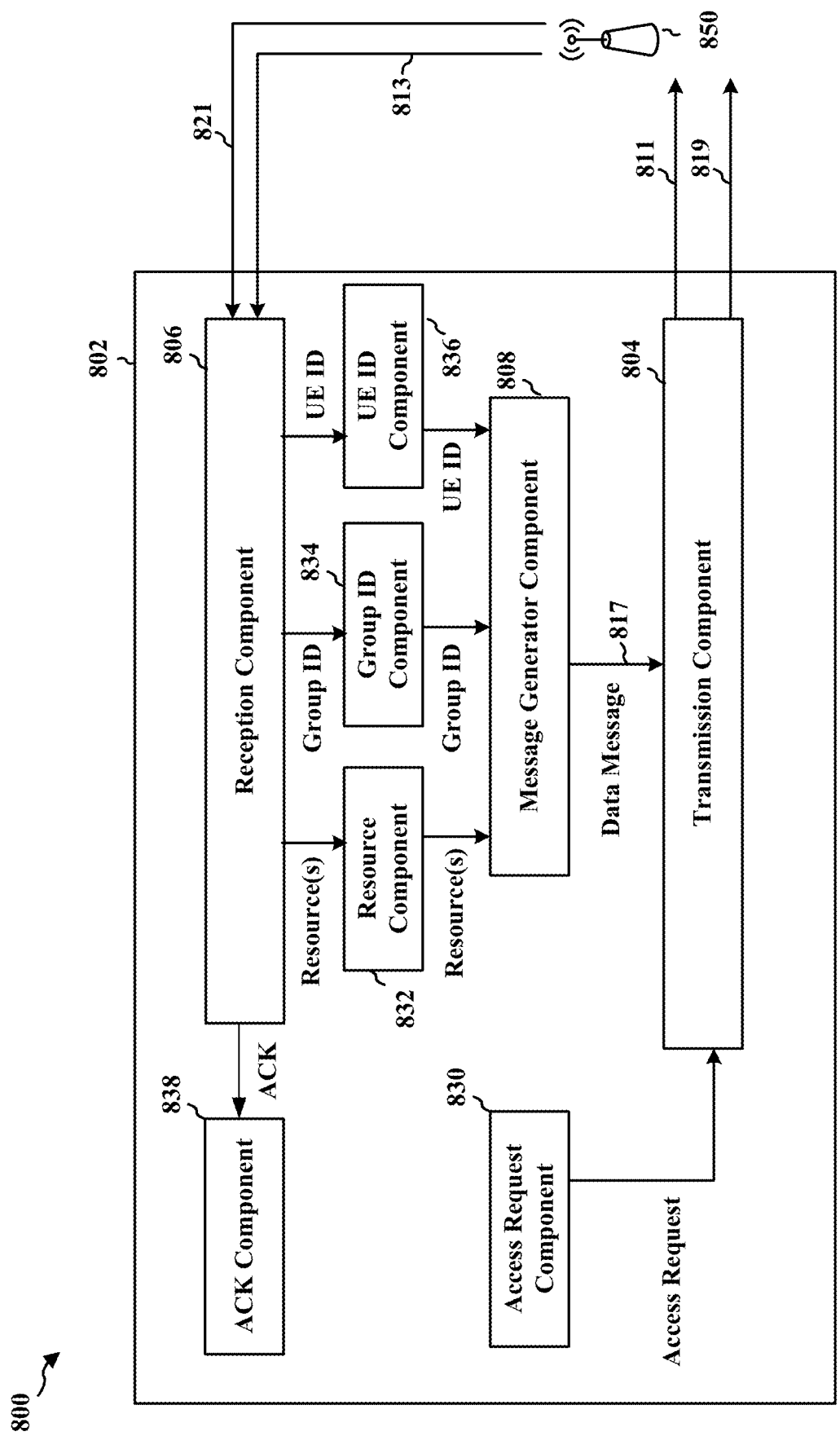
FIG. 8 is a conceptual data flow diagram illustrating the data flow between different means/components in an exemplary apparatus.

FIG. 8 is a conceptual data flow diagram 800 illustrating an example data flow between different means/components in apparatus 802. The apparatus 802 may be a UE. For example, the apparatus 802 may be any UE configured to perform one or more techniques described herein, e.g., UE 104, UE 350, UE 404, UE 502.

The apparatus 802 may include a transmission component 804 configured to transmit uplink communication to base station 850, and a reception component 806 configured to receive downlink communication from base station 850, and a message generator component 808.

The transmission component 804 may be configured to perform one or more transmission functions. For example, the transmission component 804 may be configured to send an access request message 811 to the base station, e.g., as generated by access request component 830.

The reception component 806 may be configured to perform one or more reception functions in receiving downlink communication from the base station 850. As an example, the reception component 806 may be configured to receive an indication of assigned resource(s) corresponding to a group that includes the first UE and an indication of a group identifier corresponding to the group, e.g., in connection with resource component 832. In some examples, the reception component 806 may be configured to receive the indication of one or more assigned resources corresponding to the group including the plurality of UEs that includes the first UE and the indication of a group identifier corresponding to the group in an access request response message 813 from the base station. Group ID component 834 may be configured to receive the group ID from the base station. The access request response message may be sent by the base station 850 in response to the access request message transmitted by the transmission component 804. The apparatus may further comprise a UE ID component 836 configured to receive information regarding UE ID identifier for use in communication with the base station.

The message generator component 808 may be configured to generate a message based on information received from the base station. For example, the reception component 806 may be configured to provide received information to the message generator component 808 and the transmission component 804.

The transmission component 804 may be configured to receive a message 817 from the message generator component 808. The transmission component 804 may be configured to send a message 819 (e.g., e.g., a message generated by the message generator component 808, such as a data message). For example, the transmission component 804 may be configured to send a data message 819 on the assigned resource(s) in accordance with the information received by the reception component 806 and resource component 832. Additionally, the message generator component 808 may include a UE identifier and/or a group identifier in the message. For example, the message generator component 808 may include a CRC scrambled with the group identifier from group ID component 834 for the group comprising the plurality of UEs, and wherein the message includes an indication of a UE identifier for the first UE, from UE ID component 836. In one example, the UE ID component may indicate the UE identifier based on an assigned DMRS sequence. In one example, the UE ID component 834 may generate an encoded version of the UE identifier based on the C-RNTI and the group identifier. For example, the UE ID component 834 may input the C-RNTI and the group identifier into a hashing function, wherein the encoded version of the UE identifier is based on a hash value.

The base station 850 may determine the identity of the sender of the message that was generated by the generator component 808, and send an acknowledgement message 821 to the apparatus 802. The apparatus 802 may include additional components that perform one or more UE functions described with respect to FIGS. 5-7. As such, each UE function described with respect to FIGS. 5-7 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
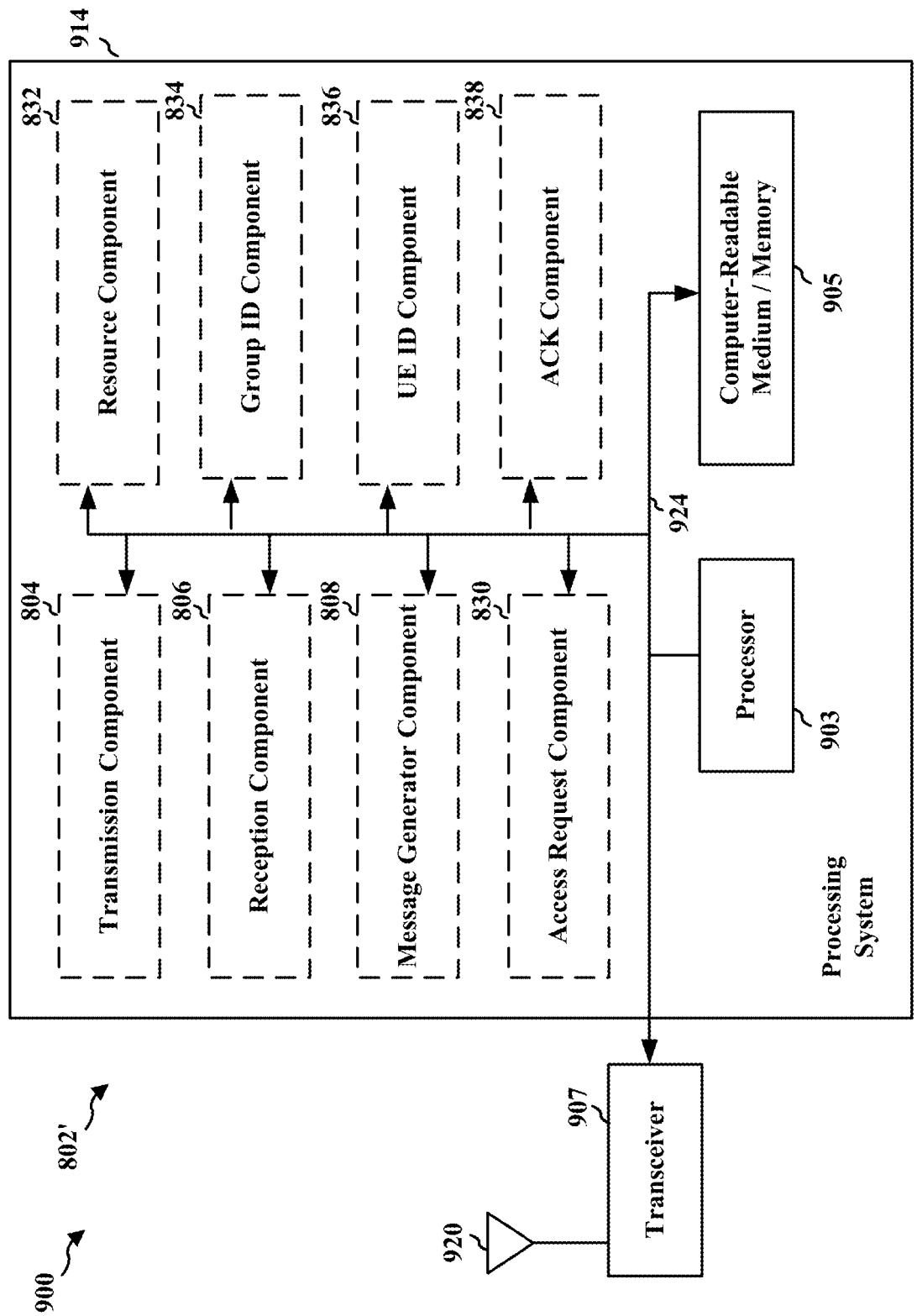
FIG. 9 is a diagram illustrating an example of a hardware implementation for an apparatus employing a processing system.

FIG. 9 is a diagram 900 illustrating an example of a hardware implementation for an apparatus 802' (e.g., the apparatus 802) employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 may link together various circuits including one or more processors and/or hardware components, represented by the processor 903, the transmission component 804, the reception component 806, the message generator component 808, and the computer-readable medium/memory 905. The bus 924 may also link various other circuits such as timing sources, peripherals, voltage regulators, and power management circuits, which are well known in the art, and therefore, will not be described any further.

The processing system 914 may be coupled to a transceiver 907. The transceiver 907 is coupled to one or more antennas 920. The transceiver 907 provides a means for communicating with various other apparatus over a transmission medium. The transceiver 907 receives a signal from the one or more antennas 920, extracts information from the received signal, and provides the extracted information to the processing system 914, specifically the reception component 806. In addition, the transceiver 907 receives information from the processing system 914, specifically the transmission component 804, and based on the received information, generates a signal to be applied to the one or more antennas 920. The processing system 914 includes a processor 903 coupled to a computer-readable medium/memory 905. The processor 903 is responsible for general processing, including the execution of software stored on the computer-readable medium/memory 905. The software, when executed by the processor 903, causes the processing system 914 to perform the various functions described herein for any particular apparatus. The computer-readable medium/memory 905 may also be used for storing data that is manipulated by the processor 903 when executing software. The processing system 914 further includes at least one of the components 804, 806, 808, 830, 832, 834, 836, 838. The components may be software components running in the processor 903, resident/stored in the computer readable medium/memory 905, one or more hardware components coupled to the processor 903, or some combination thereof. The processing system 914 may be a component of any UE described herein (e.g., UE 104, 350, 404, 502, apparatus 802). For example, the processing system 914 may include the memory 360 and/or at least one of the TX processor 368, the RX processor 356, and the controller/processor 359.

In one configuration, the apparatus 802/802' for wireless communication includes means for receiving an indication of one or more assigned resources corresponding to a group comprising a plurality of UEs that includes the first UE and an indication of a group identifier corresponding to the group, means for sending a message on the one or more assigned resources, the message including a CRC scrambled with the group identifier for the group comprising the plurality of UEs, and wherein the message includes an indication of a UE identifier for the first UE, means for receiving, by the first UE from the base station, a C-RNTI for the UE, and means for generating an encoded version of the UE identifier based on the C-RNTI and the group identifier, means for inputting the C-RNTI and the group identifier into a hashing function, wherein the encoded version of the UE identifier is based on a hash value, and means for sending an access request message, means for receiving an access request response message in response to the access request message, the access request response message including the indication of the one or more assigned resources corresponding to the group comprising the plurality of UEs that includes the first UE and the indication of the group identifier corresponding to the group. The aforementioned components of the apparatus 802 and/or the processing system 914 of the apparatus 802' may each be a means for performing the one or more functions respectively corresponding to each of the aforementioned components. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
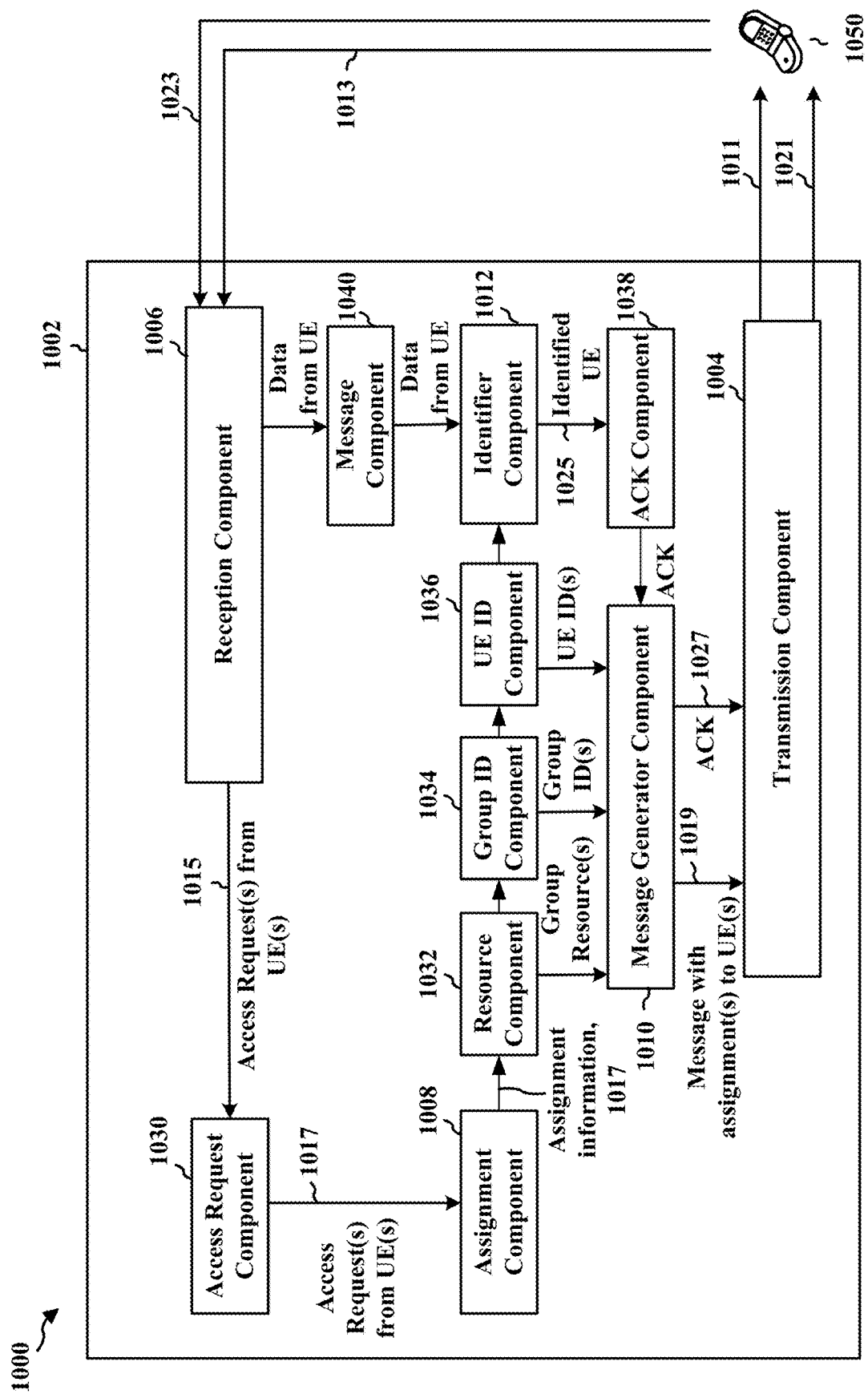
FIG. 10 is a conceptual data flow diagram illustrating the data flow between different means/components in an exemplary apparatus.

FIG. 10 is a conceptual data flow diagram 1000 illustrating an example data flow between different means/components in apparatus 1002. The apparatus 1002 may be a base station. For example, the apparatus 1002 may be any base station configured to perform one or more techniques described herein. For example, the apparatus 1002 may be any base station described herein, such as base station 102, 180, 310, 402, 504, 850, 1204.

The apparatus 1002 may include any of a transmission component 1004, a reception component 1006, an assignment component 1008, a message generator component 1010, and an identifier component 1012, access request component 1030, resource component 1032, group ID component 1034, UE ID component 1036, ACK component 1038, and message component 1040.

The reception component 1006 may be configured to receive uplink communication from UE(s) 1050. Although only a single UE 1050 is illustrated, the base station may perform similar aspects in connection with multiple UEs. As an example, the access request component 1030 may be configured to receive a message (e.g., an access request message 1013) from the UE 1050 via the reception component 1006. The assignment component 1008 may be configured to perform one or more assignments, e.g., based on information received from the UE 1050, such as information in an access request message 1013. As an example, the message assignment component 1008 may be configured to receive information 1015 received by the access request component 1030 via the reception component 1006. For example, the reception component 1006 may be configured to provide received information to access request component 1030 that provides UE information to the assignment component 1008. Such information may also be provided to the identifier component 1012, and the transmission component 1004.

In some examples, a resource component 1032, based on information from the assignment component 1008, may assign resource(s) to a group that includes the UE 1050. In other examples, a UE ID component 1036, based on information from the assignment component 1008, may assign UE ID(s) to the UE 1050. A group ID component may be configured to assign a group ID to the UE 1050, based on information from the assignment component 1008, where the group ID corresponds to a particular group (e.g., a group of UEs). The assignment component may perform each of these assignments and/or individual components 1032, 1034, 1036 may perform the assignments. In some examples, the components 1008, 1032, 1034, and/or 1036 may be configured to perform the one or more assignments in response to the access request component 1030 receiving the access request message from the UE 1050 via reception component 1006. The components 1008, 1032, 1034, and/or 1036 may be configured to output assignment information to the message generator component 1010. Assignment information 1017 may include any information assigned to the UE 1050 and/or the group to which the UE 1050 is assigned, such as one or more assigned resources, one or more assigned UE IDs, and an assigned group identifier for identifying the group to which the UE 1050 is assigned.

The message generator component 1010 may be configured to generate a message (e.g., an access request response message) based on assignment information received from any of components 1008, 1032, 1034, and/or 1036. For example, the message generator component 1010 may include the assignment information received from the assignment component 1008, resources assigned to a group from the resource component 1032, a group ID for a group of UEs from the group ID component 1034, and/or UE identifier information from UE ID component 1036.

The transmission component 1004 may be configured to receive a message (e.g., an access request response message 1019) from the message generator component 1010. The transmission component 1004 may be configured to send a message 1011 (e.g., a message generated by the message generator component 1010, such as an access request response message 1019) received from the message generator component 1010 to the UE 1050 based on the one or more assignments performed by the assignment component 1008.

The UE 1050 may send a message 1023, e.g., an unscheduled data message, to the apparatus 1002 on the assigned resource(s). A message component 1040 may be configured to receive the message on the one or more assigned resources via the reception component 1006. The message may include a CRC scrambled with a group ID for the group including the plurality of UEs that includes the UE 1050, and an indication of a UE ID for the UE 1050. In some examples, the group ID may comprise an RNTI. The indication of the UE ID may be included in a sub-header of the message. The sub-header may be a MAC header, e.g., a MAC CE. In other examples, the indication of the UE ID may be carried in an uplink control channel. In other examples, the indication of the UE ID may correspond to a specific DMRS sequence corresponding to the message. The indication of the UE ID may include the UE ID or an encoded version of the UE ID.

The identifier component 1012 may be configured to identify the sender of a message (e.g., a message represented by information flow 1023), such as a message received that includes a CRC scrambled with a group ID. For example, the identifier component may be configured to identify the sender of the message based on the indication of a UE ID and the indication of a group ID included in the message, whether implicitly or explicitly signaled. For example, the identifier component 1012 may be configured to identify the sender of the message based on at least one of: information included in the message and/or information derived from the message.

In other examples, the message received by the identifier component 1012 may include a DMRS, where the indication of the UE ID may be represented by a sequence of the DMRS. For example, the sequence of the DMRS may be unique to the UE 1050 within a group to which the UE 1050 is assigned. The apparatus 1002 may include a data structure stored in memory that maps DMRS sequences to UE IDs. For the identifier component 1012 may be configured to determine a UE ID corresponding to the UE 1050 based on the DMRS sequence by determining which UE ID in the data structure (e.g., a table or two dimensional array) corresponds to the DMRS sequence. The identifier component 1012 may, in some examples, be configured to derive a group ID corresponding to the UE 1050 based on the one or more resources used to transmit the message to the apparatus 1002.

In some examples, the indication of the UE ID included in the message 1023 may be represented by an encoded version of the UE ID. The identifier component 1012 may be configured to decode the encoded version of the UE ID to identify the UE 1050. The encoded version of the UE ID may be a hash value generated based on the UE ID corresponding to the UE 1050 and the group ID corresponding to the group to which the UE 1050 is assigned.

The message generator component 1010 may be configured to generate a message (e.g., an acknowledgement message) based on identification information received from the identifier component 1012. For example, the message generator component 1010 may include the identification information received from the identifier component 1012, represented by information flow 1025. The identification information may identify the UE 1050 as the sender of the message corresponding to information flow 1023.

Once the UE is identified by the identifier component 1012, ACK component 1038 may be configured to generate an ACK for transmission to the UE 1050. The ACK component 1038 may provide ACK information to the message generator component 1010 that generates the ACK message. The transmission component 1004 may be configured to receive a message (e.g., an acknowledgement message) from the message generator component 1010, represented by information flow 1027. The transmission component 1004 may be configured to send a message 1027 (e.g., a message generated by the message generator component 1010, such as an acknowledgement message) received from the message generator component 1010 to the UE 1050. The apparatus may then send the ACK message 1021 to the UE 1050.

The apparatus 1002 may include additional components that perform one or more base station functions described with respect to FIGS. 5-7. As such, each base station function described with respect to FIGS. 5-7 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
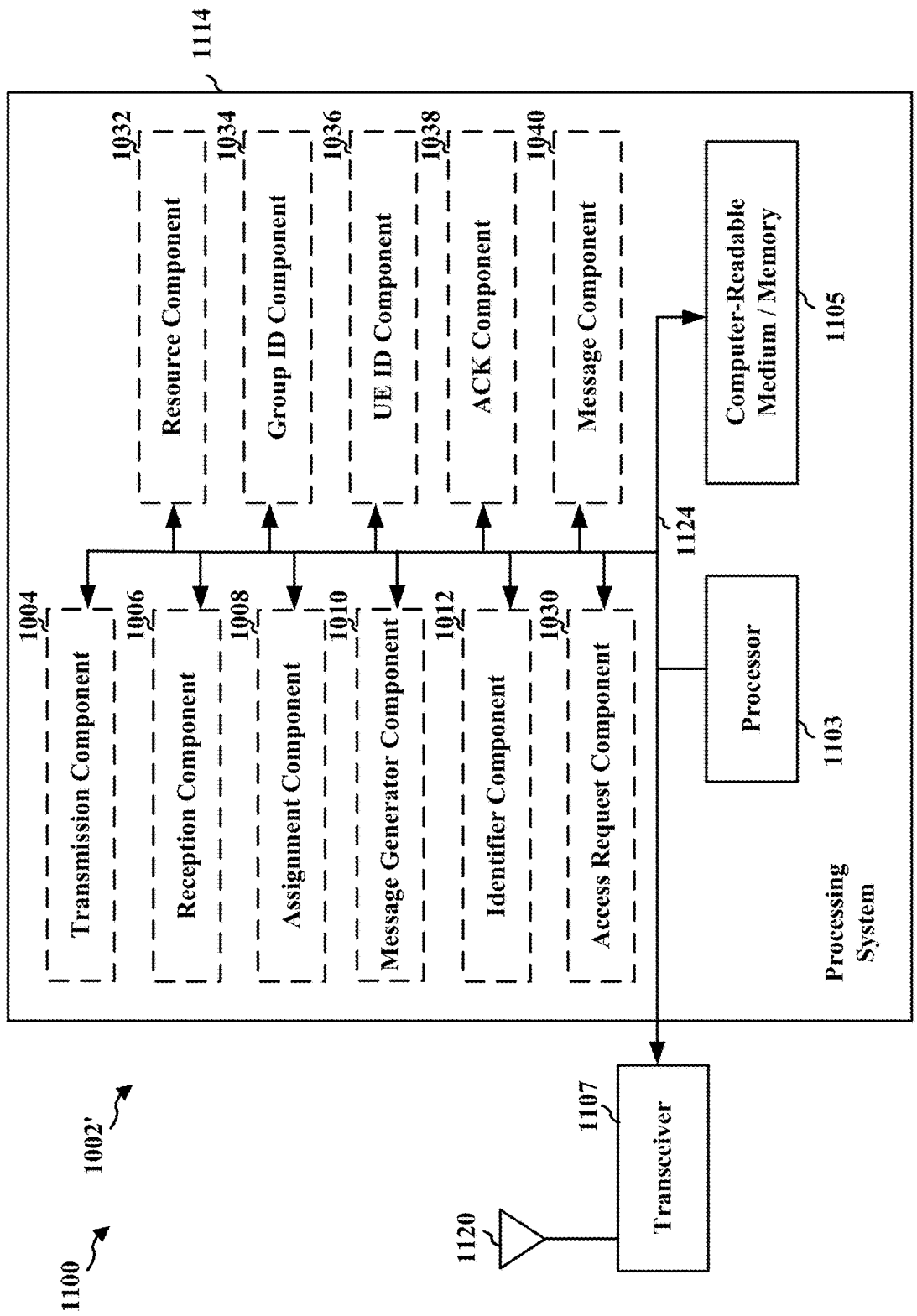
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 may link together various circuits including one or more processors and/or hardware components, represented by the processor 1103, the transmission component 1004, the reception component 1006, the assignment component 1008, the message generator component 1010, the identifier component 1012, and the computer-readable medium/memory 1105. The bus 1124 may also link various other circuits such as timing sources, peripherals, voltage regulators, and power management circuits, which are well known in the art, and therefore, will not be described any further.

The processing system 1114 may be coupled to a transceiver 1107. The transceiver 1107 is coupled to one or more antennas 1120. The transceiver 1107 provides a means for communicating with various other apparatus over a transmission medium. The transceiver 1107 receives a signal from the one or more antennas 1120, extracts information from the received signal, and provides the extracted information to the processing system 1114, specifically the reception component 1006. In addition, the transceiver 1107 receives information from the processing system 1114, specifically the transmission component 1004, and based on the received information, generates a signal to be applied to the one or more antennas 1120. The processing system 1114 includes a processor 1103 coupled to a computer-readable medium/memory 1105. The processor 1103 is responsible for general processing, including the execution of software stored on the computer-readable medium/memory 1105. The software, when executed by the processor 1103, causes the processing system 1114 to perform the various functions described herein for any particular apparatus. The computer-readable medium/memory 1105 may also be used for storing data that is manipulated by the processor 1103 when executing software. The processing system 1114 further includes at least one of the components the transmission component 1004, the reception component 1006, the assignment component 1008, the message generator component 1010, the identifier component 1012, the access request component 1030, the resource component 1032, the group ID component 1034, the UE ID component 1036, the ACK component 1038, or the message component 1040. The components may be software components running in the processor 1103, resident/stored in the computer readable medium/memory 1105, one or more hardware components coupled to the processor 1103, or some combination thereof. The processing system 1114 may be a component of any base station described herein (e.g., base station 180, base station 310, base station 402, base station 504, apparatus 1002, or any other base station configured to perform one or more techniques described herein). For example, the processing system 1114 may include the memory 360 and/or at least one of the TX processor 368, the RX processor 356, and the controller/processor 359.

In one configuration, the apparatus 1002/1002' for wireless communication includes means for assigning one or more resources to a group comprising a plurality of UEs that includes a first UE, means for receiving, from the first UE, a message on the one or more assigned resources, the message including a CRC scrambled with a group identifier for the group comprising the plurality of UEs, and wherein the message includes an indication of a UE identifier for the first UE, means for identifying the first UE, means for identifying the first UE based on a DMRS sequence, means for sending an ACL message in response to the message based on the identification of the first UE, means for determining the group identifier corresponding to the group including the first UE based on the one or more assigned resources used to communicate the message, means for identifying the first UE based on the indication of the UE included in the message and the determined group identifier, means for identifying the first UE based on the UE identifier and the group identifier included in the message, and means for decoding the encoded version of the UE identifier to identify the first UE. The aforementioned components of the apparatus 1002 and/or the processing system 1114 of the apparatus 1002' may each be a means for performing the one or more functions respectively corresponding to each of the aforementioned components. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
    receiving, by the first UE from a base station, an indication of one or more assigned resources corresponding to a group comprising a plurality of UEs that includes the first UE and an indication of a group identifier corresponding to the group; and
    sending, by the first UE to the base station, a message on the one or more assigned resources, the message including a cyclic redundancy check (CRC) scrambled with the group identifier for the group comprising the plurality of UEs, and wherein the message includes an indication of a UE identifier for the first UE.

2. The method of claim 1, wherein the message includes a Demodulation Reference Signal (DMRS), and wherein the indication of the UE identifier is represented by a sequence of the DMRS.

3. The method of claim 2, wherein the sequence of the DMRS is unique to the first UE within the group.

4. The method of claim 1, wherein the indication of the UE identifier is included in a sub-header of the message, and wherein the indication of the UE identifier comprises the UE identifier or an encoded version of the UE identifier.

5. The method of claim 4, wherein the sub-header includes a Medium Access Control (MAC) control element.

6. The method of claim 1, wherein the message is sent over an uplink control channel.

7. The method of claim 1, wherein the UE identifier corresponding to the first UE is specific to the group.

8. The method of claim 7, wherein resources on which the message is sent correspond to the indication of the group identifier.

9. The method of claim 7, wherein the message includes the indication of the group identifier.

10. The method of claim 1, wherein the indication of the UE identifier comprises an encoded version of the UE identifier.

11. The method of claim 10, further comprising:
    receiving, by the first UE from the base station, a cell radio network temporary identity (C-RNTI) for the UE; and
    generating, by the first UE, the encoded version of the UE identifier based on the identifier-RNTI and the group identifier.

12. The method of claim 11, wherein generating the encoded version of the UE identifier comprises:
    inputting the C-RNTI and the group identifier into a hashing function, wherein the encoded version of the UE identifier is based on a hash value.

13. The method of claim 1, further comprising:
    sending, by the first UE to the base station, an access request message; and
    receiving, by the first UE from the base station, an access request response message in response to the access request message, the access request response message including the indication of the one or more assigned resources corresponding to the group comprising the plurality of UEs that includes the first UE and the indication of the group identifier corresponding to the group, wherein the UE sends the message on the one or more assigned resources in response to the access request response message.

14. A first user equipment (UE), comprising:
a memory configured to store data; and
one or more processors communicatively coupled with the memory, wherein the one or more processors are configured to:
receive, from a base station, an indication of one or more assigned resources corresponding to a group comprising a plurality of UEs that includes the first UE and an indication of a group identifier corresponding to the group;
store, in the memory, the indication of the one or more assigned resources and the indication of the group identifier; and
send, to the base station, a message on the one or more assigned resources, the message including a cyclic redundancy check (CRC) scrambled with the group identifier for the group comprising the plurality of UEs, and wherein the message includes an indication of a UE identifier for the first UE.

15. The first UE of claim 14, wherein the message includes a Demodulation Reference Signal (DMRS), and wherein the indication of the UE identifier is represented by a sequence of the DMRS.

16. The first UE of claim 15, wherein the sequence of the DMRS is unique to the first UE within the group.

17. The first UE of claim 14, wherein the indication of the UE identifier comprises and encoded version of the UE identifier, wherein the one or more processors are further configured to:
receive, from the base station, a cell radio network temporary identity (C-RNTI) for the UE; and
generate the encoded version of the UE identifier based on the identifier-RNTI and the group identifier.

18. The first UE of claim 14, wherein the one or more processors are further configured to:
send, to the base station, an access request message; and
receive, from the base station, an access request response message in response to the access request message, the access request response message including the indication of the one or more assigned resources corresponding to the group comprising the plurality of UEs that includes the first UE and the indication of the group identifier corresponding to the group, wherein the UE sends the message on the one or more assigned resources in response to the access request response message.

19. A method of wireless communication of a base station, comprising:
assigning, by the base station, one or more resources to a group comprising a plurality of UEs that includes a first UE; and
receiving, by the base station from the first UE, a message on the one or more assigned resources, the message including a cyclic redundancy check (CRC) scrambled with a group identifier for the group comprising the plurality of UEs, and wherein the message includes an indication of a UE identifier for the first UE.

20. The method of claim 19, wherein the message includes a Demodulation Reference Signal (DMRS), and wherein the indication of the UE identifier is represented by a sequence of the DMRS, the method further comprising:
identifying, by the base station, the first UE based on the DMRS sequence.

21. The method of claim 20, wherein the sequence of the DMRS is unique to the first UE within the group.

22. The method of claim 21, wherein the indication of the UE identifier is received in an uplink control channel.

23. The method of claim 19, wherein the indication of the UE identifier is included in a sub-header of the message, and wherein the indication of the UE identifier comprises the UE identifier or an encoded version of the UE identifier.

24. The method of claim 19, further comprising:
identifying the first UE based on the indication of the UE identifier for the first UE;
sending, from the base station to the first UE, an acknowledgement message in response to the message based on the identification of the first UE.

25. The method of claim 19, wherein the UE identifier corresponding to the first UE is specific to the group.

26. The method of claim 19, wherein the UE identifier corresponding to the first UE is specific to the group, the method further comprising:
determining, by the base station, the group identifier corresponding to the group including the first UE based on the one or more assigned resources used to communicate the message; and
identifying, by the base station, the first UE based on the indication of the UE included in the message and the determined group identifier.

27. The method of claim 19, wherein the UE identifier corresponding to the first UE is specific to the group, and wherein the indication of the UE identifier comprises the UE identifier, and wherein the message includes the UE identifier and the group identifier, the method further comprising:
identifying, by the base station, the first UE based on the UE identifier and the group identifier included in the message.

28. The method of claim 19, wherein the indication of the UE identifier comprises an encoded version of the UE identifier, the method further comprising:
decoding the encoded version of the UE identifier to identify the first UE.

29. The method of claim 19, further comprising:
receiving, by the base station from the first UE, an access request message; and
sending, by the base station to the first UE, at least one of an indication of the one or more assigned resources assigned to the group and an indication of the group identifier for the group in response to the access request message.

30. A base station, comprising:
a memory configured to store data; and
one or more processors communicatively coupled with the memory, wherein the one or more processors are configured to:
assign one or more resources to a group comprising a plurality of UEs that includes a first UE;
receive, from the first UE, a message on the one or more assigned resources, the message including a cyclic redundancy check (CRC) scrambled with a group identifier for the group comprising the plurality of UEs, and wherein the message includes an indication of a UE identifier for the first UE; and
store the message in the memory.

31. The base station of claim 30, wherein the message includes a Demodulation Reference Signal (DMRS), wherein the indication of the UE identifier is represented by a sequence of the DMRS, wherein the sequence of the DMRS is unique to the first UE within the group, and wherein the one or more processors are further configured to:

identify the first UE based on the DMRS sequence.

\* \* \* \* \*